(12) United States Patent
Schaffert

(10) Patent No.: US 12,648,509 B2
(45) Date of Patent: Jun. 9, 2026

(54) WALKING BEAM FOR PRESS WHEEL ON PLANTER TRAILING SYSTEM

(71) Applicant: SCHAFFERT MANUFACTURING COMPANY, INC., Indianola, NE (US)

(72) Inventor: Kris Schaffert, Indianola, NE (US)

(73) Assignee: SCHAFFERT MANUFACTURING COMPANY, INC., Indianola, NE (US)

(*) Notice: Subject to any disclaimer, the term of this patent is extended or adjusted under 35 U.S.C. 154(b) by 1083 days.

(21) Appl. No.: 17/591,417

(22) Filed: Feb. 2, 2022

(65) Prior Publication Data

US 2022/0240439 A1     Aug. 4, 2022

Related U.S. Application Data

(60) Provisional application No. 63/144,943, filed on Feb. 2, 2021.

(51) Int. Cl.
A01C 5/06 (2006.01)
A01C 7/06 (2006.01)

(52) U.S. Cl.
CPC ................ A01C 7/06 (2013.01); A01C 5/064 (2013.01); A01C 5/068 (2013.01)

(58) Field of Classification Search
CPC ............ A01C 7/06; A01C 5/064; A01C 5/068
USPC .......................... 111/191, 192, 194; 172/176
See application file for complete search history.

(56) References Cited

U.S. PATENT DOCUMENTS

| | | | |
|---|---|---|---|
| 13,683 A | 10/1855 | McCormick | |
| 35,510 A | 6/1862 | De Haven | |

| | | | |
|---|---|---|---|
| 122,299 A | 12/1871 | Wight et al. | |
| 166,597 A | 8/1875 | Evans | |
| 176,708 A | 4/1876 | Templin | |
| 203,207 A | 4/1878 | Springer | |

(Continued)

FOREIGN PATENT DOCUMENTS

| | | |
|---|---|---|
| DE | 3321490 A1 | 12/1984 |
| DE | 3441610 A1 | 5/1986 |

(Continued)

OTHER PUBLICATIONS

AGCO, "Tye, Parts Catalog, 2015/2020 Rice and Soybean Drill Eff. S/N K-6-1367-10-RD," Jun. 1996, Form No. 79017760, Litho in U.S.A., 3 pages.

(Continued)

*Primary Examiner* — Jamie L McGowan
(74) *Attorney, Agent, or Firm* — Dorsey & Whitney LLP

(57) ABSTRACT

A trailing assembly for an agricultural planter is attached to a frame element of the agricultural planter with a mounting bracket. A walking beam having a hub at an intermediate position along a length of the walking beam is pivotally attached to the mounting bracket. A first pair of arms extends from the hub in a first direction, with each arm configured with a shaft to rotatably and selectively receive a first rotating implement, for example, a closing wheel or a fertilizer opener disc. A second pair of arms extends from the hub in a second direction parallel to each other and spaced apart from each other. Distal ends of the second pair of arms are configured to rotatably and selectively receive and support opposing ends of an axle of another rotating implement, for example, a press wheel, positioned between the second set of arms.

18 Claims, 18 Drawing Sheets

(56) References Cited

U.S. PATENT DOCUMENTS

| | | | |
|---|---|---|---|
| 211,601 A | 1/1879 | Springer | |
| 252,265 A | 1/1882 | Scofield | |
| 288,661 A | 11/1883 | Purdy et al. | |
| 308,327 A | 11/1884 | Runstetler | |
| 322,841 A | 7/1885 | Miskimen | |
| 555,897 A | 3/1896 | Crane | |
| 700,109 A | 5/1902 | Wilkinson | |
| 889,947 A | 6/1908 | Miller | |
| 907,278 A | 12/1908 | Hammonds | |
| 909,137 A | 1/1909 | Bellerive | |
| 952,447 A | 3/1910 | Hammonds | |
| 974,247 A | 11/1910 | Douglass et al. | |
| 1,059,534 A | 4/1913 | Forrest | |
| 1,377,073 A | 5/1921 | Amon | |
| 1,473,297 A | 11/1923 | Knight | |
| 1,483,789 A | 2/1924 | Earhart | |
| 1,498,378 A | 6/1924 | Irwin | |
| 2,039,166 A | 4/1936 | Karl | |
| 2,061,694 A | 11/1936 | Cuddigan | |
| 2,401,577 A | 6/1946 | Melling | |
| 2,533,374 A | 12/1950 | Hyland | |
| 2,601,591 A | 6/1952 | Colombo | |
| 2,668,490 A | 2/1954 | Oehler et al. | |
| 2,694,356 A * | 11/1954 | Haas | A01C 7/06 |
| | | | 111/136 |
| 2,805,486 A | 9/1957 | Barrett | |
| 2,849,969 A | 9/1958 | Taylor | |
| 2,872,883 A | 2/1959 | Padrick | |
| 2,912,055 A | 11/1959 | Cornelius et al. | |
| 2,991,836 A | 7/1961 | Le Roy | |
| 3,115,192 A | 12/1963 | Bushmeyer | |
| 3,173,498 A | 3/1965 | Harold | |
| 3,177,830 A | 4/1965 | Zimmerman | |
| 3,212,585 A | 10/1965 | Bezzerides | |
| 3,306,371 A | 2/1967 | Eugene | |
| 3,336,885 A | 8/1967 | Lebow | |
| 3,599,729 A | 8/1971 | Greemore | |
| 3,666,572 A | 5/1972 | Nakagawa et al. | |
| 3,734,201 A | 5/1973 | Zaun | |
| 3,895,589 A | 7/1975 | Garner et al. | |
| 4,037,755 A | 7/1977 | Reuter | |
| 4,070,974 A | 1/1978 | Stacy | |
| 4,108,089 A | 8/1978 | van der Lely | |
| 4,148,267 A | 4/1979 | Bennett et al. | |
| 4,253,412 A | 3/1981 | Hogenson | |
| 4,276,836 A | 7/1981 | Pust | |
| 4,294,181 A | 10/1981 | Smith | |
| 4,296,670 A | 10/1981 | Northup et al. | |
| 4,373,455 A | 2/1983 | Friggstad | |
| 4,398,478 A * | 8/1983 | Frase | A01C 5/066 |
| | | | 111/164 |
| 4,407,207 A * | 10/1983 | Dreyer | A01C 5/06 |
| | | | 172/764 |
| 4,542,705 A | 9/1985 | Orth | |
| 4,565,141 A | 1/1986 | Kopecky | |
| 4,580,507 A | 4/1986 | Dreyer et al. | |
| 4,607,581 A | 8/1986 | Kopecky | |
| 4,628,841 A | 12/1986 | Powilleit | |
| 4,671,193 A | 6/1987 | States | |
| 4,674,419 A | 6/1987 | Kopecky | |
| 4,744,316 A | 5/1988 | Lienemann et al. | |
| 4,750,441 A * | 6/1988 | Pfenninger | A01C 5/06 |
| | | | 111/140 |
| 4,819,737 A | 4/1989 | Frase | |
| 4,834,189 A | 5/1989 | Peterson et al. | |
| 4,858,698 A | 8/1989 | Williamson et al. | |
| D305,337 S | 1/1990 | Plummer | |
| 4,911,090 A | 3/1990 | Schimke | |
| 5,000,270 A | 3/1991 | Phillips | |
| 5,074,227 A * | 12/1991 | Schwitters | A01C 5/06 |
| | | | 111/926 |
| 5,078,528 A | 1/1992 | Schmidt | |
| 5,092,255 A | 3/1992 | Long et al. | |
| 5,163,518 A | 11/1992 | Foley | |
| 5,341,754 A | 8/1994 | Winterton | |
| 5,361,848 A | 11/1994 | Fleischer et al. | |
| 5,375,542 A * | 12/1994 | Schaffert | A01C 5/066 |
| | | | 301/128 |
| 5,398,771 A | 3/1995 | Hornung et al. | |
| 5,419,402 A | 5/1995 | Heintzman | |
| 5,425,318 A | 6/1995 | Keeton | |
| 5,443,023 A | 8/1995 | Carroll | |
| 5,461,995 A | 10/1995 | Winterton | |
| 5,497,836 A | 3/1996 | Groff | |
| 5,499,685 A * | 3/1996 | Downing, Jr. | A01C 5/062 |
| | | | 111/140 |
| 5,517,932 A | 5/1996 | Ott et al. | |
| D377,356 S | 1/1997 | Bruns | |
| 5,626,196 A | 5/1997 | Hughes | |
| 5,628,372 A | 5/1997 | Creyke | |
| 5,640,915 A | 6/1997 | Schaffert | |
| 5,645,000 A | 7/1997 | Carroll | |
| 5,662,173 A | 9/1997 | Blesing | |
| 5,673,638 A | 10/1997 | Keeton | |
| D386,191 S | 11/1997 | Bruns | |
| 5,730,074 A | 3/1998 | Peter | |
| 5,732,780 A | 3/1998 | Nikkel et al. | |
| D396,863 S | 8/1998 | Bruns | |
| 5,852,982 A | 12/1998 | Peter | |
| 5,884,711 A | 3/1999 | Shoup | |
| 5,896,932 A | 4/1999 | Bruns et al. | |
| 5,904,107 A | 5/1999 | Kester | |
| 5,918,557 A | 7/1999 | Schaffert | |
| 5,970,891 A | 10/1999 | Schlagel | |
| 5,996,514 A | 12/1999 | Arriola et al. | |
| 6,082,274 A | 7/2000 | Peter | |
| 6,082,275 A | 7/2000 | Schaffert | |
| 6,119,608 A | 9/2000 | Peterson et al. | |
| 6,148,747 A | 11/2000 | Deckler et al. | |
| D440,985 S | 4/2001 | Noonan et al. | |
| 6,209,466 B1 | 4/2001 | Wodrich | |
| 6,220,191 B1 | 4/2001 | Peter | |
| 6,283,050 B1 | 9/2001 | Schaffert | |
| 6,314,897 B1 | 11/2001 | Hagny | |
| 6,321,667 B1 | 11/2001 | Shoup | |
| 6,453,832 B1 | 9/2002 | Schaffert | |
| 6,530,334 B2 | 3/2003 | Hagny | |
| 6,640,732 B2 | 11/2003 | Prairie et al. | |
| 6,763,773 B2 | 7/2004 | Schaffert | |
| 6,918,343 B2 | 7/2005 | Kester | |
| 7,121,216 B2 | 10/2006 | Schaffert | |
| 7,246,563 B2 | 7/2007 | Kester | |
| 7,322,302 B1 | 1/2008 | Reidhar | |
| 7,360,495 B1 | 4/2008 | Martin | |
| 7,410,005 B2 | 8/2008 | Lung et al. | |
| 7,520,338 B2 | 4/2009 | Stokes | |
| D594,477 S | 6/2009 | Dawson et al. | |
| 7,552,689 B2 | 6/2009 | Schaffert | |
| 7,581,503 B2 | 9/2009 | Martin | |
| 7,594,546 B2 * | 9/2009 | Ankenman | A01B 29/06 |
| | | | 172/540 |
| D611,507 S | 3/2010 | Martin | |
| 7,707,952 B2 | 5/2010 | Schaffert | |
| 7,730,961 B2 | 6/2010 | Ward et al. | |
| 7,975,629 B1 | 7/2011 | Martin | |
| 8,047,301 B2 * | 11/2011 | Friggstad | A01C 5/064 |
| | | | 111/163 |
| D663,326 S | 7/2012 | Allensworth et al. | |
| 8,267,021 B2 | 9/2012 | Mariman et al. | |
| 8,291,998 B1 | 10/2012 | Berg et al. | |
| 8,333,161 B2 | 12/2012 | Arnett et al. | |
| 8,343,291 B1 | 1/2013 | Loen et al. | |
| 8,356,563 B2 | 1/2013 | Schaffert et al. | |
| 8,359,988 B2 | 1/2013 | Bassett | |
| 8,397,612 B2 | 3/2013 | Koplin et al. | |
| 8,544,398 B2 | 10/2013 | Bassett | |
| 8,555,798 B2 | 10/2013 | Friggstad et al. | |
| D699,267 S | 2/2014 | Nelson | |
| 8,863,857 B2 | 10/2014 | Bassett | |
| 8,910,581 B2 | 12/2014 | Bassett | |
| 8,910,582 B2 | 12/2014 | Mariman et al. | |
| 8,939,095 B2 * | 1/2015 | Freed | A01C 5/068 |
| | | | 111/926 |

(56) References Cited

U.S. PATENT DOCUMENTS

| | | | |
|---|---|---|---|
| D727,975 S | 4/2015 | Brockway | |
| D727,976 S | 4/2015 | Brockway | |
| 9,148,989 B2* | 10/2015 | Van Buskirk | A01C 5/066 |
| 9,204,590 B2 | 12/2015 | Schaffert et al. | |
| 9,232,689 B2* | 1/2016 | Trevino | A01C 23/025 |
| 9,365,996 B2 | 6/2016 | Brockway | |
| 9,497,900 B2* | 11/2016 | Nelson | A01C 5/064 |
| 9,516,803 B1 | 12/2016 | Rosenboom | |
| 9,681,599 B2 | 6/2017 | Whalen et al. | |
| 9,750,176 B2* | 9/2017 | Raetzman | A01C 5/068 |
| 9,872,425 B2* | 1/2018 | Anderson | A01C 7/203 |
| 9,943,030 B2* | 4/2018 | Sheppard | A01C 7/205 |
| 10,060,467 B2 | 8/2018 | Schaffert et al. | |
| D844,675 S | 4/2019 | Schaffert | |
| 10,383,274 B2 | 8/2019 | Whalen et al. | |
| 10,624,252 B2 | 4/2020 | Nance | |
| 10,624,253 B2* | 4/2020 | Kovach | A01B 71/02 |
| D883,345 S | 5/2020 | Schaffert | |
| 10,798,870 B2 | 10/2020 | Schaffert et al. | |
| 11,477,931 B2 | 10/2022 | Hake et al. | |
| 11,723,301 B2* | 8/2023 | Schaffert | A01C 7/06 |
| | | | 111/118 |
| 11,937,532 B2* | 3/2024 | Martin | A01C 5/066 |
| 12,030,465 B2* | 7/2024 | Schaffert | A01C 5/068 |
| 2002/0078869 A1 | 6/2002 | Brummelhuis | |
| 2003/0051650 A1 | 3/2003 | Engelke et al. | |
| 2005/0072344 A1 | 4/2005 | Kester | |
| 2005/0155536 A1 | 7/2005 | Wendte et al. | |
| 2007/0113763 A1 | 5/2007 | Schaffert | |
| 2007/0278272 A1 | 12/2007 | Fast | |
| 2008/0011208 A1 | 1/2008 | Martin | |
| 2008/0066662 A1 | 3/2008 | Hesla | |
| 2008/0257237 A1 | 10/2008 | Friesen et al. | |
| 2008/0303238 A1 | 12/2008 | Fichter | |
| 2009/0000796 A1 | 1/2009 | Cooper et al. | |
| 2009/0056962 A1* | 3/2009 | Martin | A01C 5/066 |
| | | | 172/551 |
| 2009/0084295 A1 | 4/2009 | Schaffert | |
| 2009/0235853 A1 | 9/2009 | Schaffert | |
| 2011/0155031 A1 | 6/2011 | Arnett et al. | |
| 2012/0048160 A1 | 3/2012 | Adams et al. | |
| 2012/0210919 A1* | 8/2012 | Van Buskirk | A01B 49/06 |
| | | | 111/139 |
| 2012/0210920 A1 | 8/2012 | Bassett | |
| 2012/0241181 A1 | 9/2012 | Horsch | |
| 2012/0325133 A1 | 12/2012 | Whalen et al. | |
| 2013/0074747 A1 | 3/2013 | Schaffert et al. | |
| 2013/0160684 A1 | 6/2013 | Whalen et al. | |
| 2013/0263767 A1* | 10/2013 | Trevino | A01C 5/066 |
| | | | 111/121 |
| 2014/0033958 A1 | 2/2014 | Bassett | |
| 2014/0116735 A1 | 5/2014 | Bassett | |
| 2014/0290545 A1* | 10/2014 | Van Buskirk | A01B 63/32 |
| | | | 172/315 |
| 2015/0075825 A1 | 3/2015 | Dufty | |
| 2015/0195986 A1* | 7/2015 | Dames | A01C 7/08 |
| | | | 111/52 |
| 2016/0014951 A1 | 1/2016 | Stark et al. | |
| 2016/0050837 A1* | 2/2016 | Schaffert | A01B 23/04 |
| | | | 172/705 |
| 2016/0106025 A1 | 4/2016 | Nelson et al. | |
| 2016/0120096 A1 | 5/2016 | Patwardhan et al. | |
| 2017/0000006 A1 | 1/2017 | Raetzman et al. | |
| 2017/0079193 A1* | 3/2017 | Sheppard | A01C 7/205 |
| 2017/0208736 A1* | 7/2017 | Schaffert | A01C 5/068 |
| 2018/0054948 A1* | 3/2018 | Dietrich, Sr. | A01C 5/066 |
| 2019/0271356 A1* | 9/2019 | Schaffert | A01C 5/06 |
| 2020/0068779 A1* | 3/2020 | Barker | A01C 5/066 |
| 2020/0100423 A1* | 4/2020 | Dienst | A01C 5/066 |
| 2020/0107487 A1* | 4/2020 | Antich | A01C 7/203 |
| 2020/0396894 A1* | 12/2020 | Radtke | A01C 5/068 |
| 2021/0161063 A1 | 6/2021 | Schaffert et al. | |
| 2021/0301863 A1 | 9/2021 | Schaffert et al. | |
| 2022/0210962 A1* | 7/2022 | Martin | A01B 27/00 |
| 2022/0240439 A1* | 8/2022 | Schaffert | A01C 7/06 |
| 2023/0157200 A1* | 5/2023 | Wagler | A01C 5/068 |
| | | | 111/191 |
| 2023/0225240 A1* | 7/2023 | Schaffert | A01C 5/068 |
| | | | 172/1 |
| 2024/0032456 A1 | 2/2024 | Schaffert et al. | |

FOREIGN PATENT DOCUMENTS

| | | |
|---|---|---|
| DE | 4235389 A1 | 3/1994 |
| EP | 2055508 A2 | 5/2009 |
| EP | 2055509 A1 | 5/2009 |
| EP | 1964459 B1 | 12/2011 |

OTHER PUBLICATIONS

Author Unknown, "1200 Series Advanced Seed Meter Planters", Case IiI, 2005, 1-35.

Author Unknown, "3000 Series Kinze Planters", 2003, 3-6 and 12.

Author Unknown, "8000 Series Planters: Simply Advanced", White Planters, 2001, 13-15.

Author Unknown, "Brochure: The Precision Vacuum Planter, NG Plus Series", A.T.I., Inc., Monosem, Lenexa, Kansas, at least as early as Dec. 21, 2007, and Photos A-G, Dec. 21, 2007, 10 pages.

Author Unknown, "Changing Planting Depth", at least as early as Dec. 21, 2007, Dec. 21, 2007, 3 pages.

Author Unknown, "Cost-Effective Solutions for Real-World Needs", Yetter Profitable Solutions, at least as early as Dec. 21, 2007, Dec. 21, 2007, 1-29.

Author Unknown, "Dawn 1572/1500 Coulter Combo", Jul. 28, 2004, Jul. 28, 2004, 2 pages.

Author Unknown, "Dawn Curvtine™ Closing Wheel", 1997, 2 pages.

Author Unknown, "Dawn Trashwheels Row Cleaner", at least as early as Dec. 21, 2007, Dec. 21, 2007, 1 page.

Author Unknown, "Ferti-Placer", Schaffert Manufacturing Co., Inc., at least as early as Dec. 21, 2007, Dec. 21, 2007, 2 pages.

Author Unknown, "Groff AG Improvements, LLC", at least as early as Dec. 21, 2007, Dec. 21, 2007, 4 pages.

Author Unknown, "Hawkins Manufacturing Inc.", at least as early as 2002, 2002, 1 page.

Author Unknown, "Heavy-Duty Coulter", at least as early as Dec. 21, 2007, Dec. 21, 2007, 3 pages.

Author Unknown, "http://precision_planting.com/html/keeton. html", at least as early as Dec. 30, 2000, Dec. 30, 2000, 1 page.

Author Unknown, "Keeton Seed Firmer", J & K Enterprises, 1994, 2 pages.

Author Unknown, "Keeton Seed Firmer, Precision Planting", at least as early as Apr. 9, 2001, Apr. 9, 2001, 4 pages.

Author Unknown, "Photos Labeled "Photo A" and "Photo B"", Oct. 17, 2007, Oct. 17, 2007, 1 page.

Author Unknown, "Planter "N" Forcer, Planter Fertilizer Attachments online product information description", Hawkins Mfg. Inc. Retrieved from http://www.hawkinsmfg.com/ attachments.htm on Dec. 9, 2012, Dec. 9, 2012, 2 pages.

Author Unknown, "Planter Fertilizer Attachments", Hawkins Manufacturing Inc., at least as early as Dec. 21, 2007, Dec. 21, 2007, 4 pages.

Author Unknown, "Seed to Soil Inforcer", Seed Flap, Spring 1995, 1995, 1 page.

Author Unknown, "Sunco: Effectively Moves Trash in All Conditions!", at least as early as Dec. 21, 2007, Dec. 21, 2007, 2 pages.

Author Unknown, "Sunco: Your Solution for Accurate Starter Fertilizer Placement", at least as early as Dec. 21, 2007, Dec. 21, 2007, 2 pages.

Author Unknown, "Tine-Tooth Row Tillage Attachment", at least as early as Dec. 21, 2007, Dec. 21, 2007, 9 pages.

Author Unknown, "Tube Alignment Brackets", M & J Cotton Farms, Inc., at least as early as Oct. 30, 1995, Oct. 30, 1995, 1 page.

Author Unknown, "We Know It's All About Strong Roots", Yetter Profitable Solutions, at least as early as Dec. 21, 2007, Dec. 21, 2007, 1-29.

(56)  References Cited

OTHER PUBLICATIONS

Author Unknown, "Yield-Pro Planters: Unsurpassed in form, function and safety", Great Plains, at least as early as Dec. 21, 2007, Dec. 21, 2007, 4, 5 and 10.
Author Unknown, "Yield-Pro Planters: Yield increasing row spacing options coupled with best in class productivity and accuracy", at least as early as Dec. 21, 2007, Dec. 21, 2007, 1 page.
Finck, "Where to start with starter fertilizer", Farm Journal, Jan. 1996, Jan. 1996, 15-16.

* cited by examiner

WALKING BEAM FOR PRESS WHEEL ON PLANTER TRAILING SYSTEM

CROSS-REFERENCE TO RELATED APPLICATIONS

This application claims priority to and the benefit of U.S. Provisional Patent Application No. 63/144,943 filed Feb. 2, 2021 entitled "WALKING BEAM FOR PRESS WHEEL ON PLANTER TRAILING SYSTEM", the entire disclosure of which is incorporated herein in its entirety by reference.

FIELD

The disclosed technology relates to agricultural seed planters and, in particular, to planter trailing devices.

BACKGROUND

Agricultural seed planting is typically accomplished by multi-row planters. Each planter may include multiple row units adapted for opening a seed furrow, depositing seeds within the furrow, and closing the seed furrow over the seeds.

Some planters are equipped or retrofitted to be equipped with fertilizer depositing equipment (e.g., fertilizer furrow opener discs and fertilizer deposit tubes). Planters so configured can have problems in fields with moist or wet soil. Specifically, disturbing the soil with the fertilizer equipment located in front of the planter gauge wheels can cause the moist or wet soil to accumulate on the gauge wheels. The soil accumulation increases the effective diameters of the gauge wheels and may cause the planter to run too shallow with respect to the depositing of the seed in the seed furrows.

Planters are increasingly used in no-till situations, resulting in the planter traversing fields with substantial relief in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Many planters have proven ineffective in such rough field surface conditions. It is not unusual for the use of planters in rough field conditions to result in seed depths that range between too deep and too shallow, which may directly affect crop emergence and ultimate yield. Also, it is not unusual for the use of planters in such field conditions to result in the planter components being damaged.

Traditional closing assemblies use standard single pivot swing arm tail sections, which can be found on many of the planters built today. These standard swing arm tail sections have a limited amount of travel up and down (roughly 4") throughout full movement when planting. These tail sections are limited when there are ditches to cross or terraces to plant over, as the amount of travel is generally limited to 2" both ways of center. Sometimes a 4" range of motion is not enough as it gives poor seed to soil contact by not closing the seed V properly or leaving seeds on top of the ground. Also, when the press wheels flex upwardly the contact points on the press wheels get wider (spaced farther apart) causing them to be "toe out" and they tend to over-cover the width of the seed V (furrow). When the press wheels move downwardly past center the contact points on the press wheels get closer together, resulting in "toe in," which causes them to under-cover the seed V, and not close it properly. Thus, swing arm tail sections have severe limitations that affect the seed emergence and thus crop yield.

Furthermore, as the planter travels through the field at speeds above 5 MPH, the swing arm closing systems are constantly moving or vibrating up and down relative to the planter unit itself (such as by bouncing over obstructions) causing uneven depth control. Also when planting up and over deviations in the field surface, the double discs of the planter may be caused to lift out of the ground, thereby causing the furrow disk to lose contact with the ground and resulting in planting the seeds on top of the ground. In some instances, the press wheels carry the weight of whole planter at a first surface deviation and then at a second, adjacent surface deviation, the double discs openers bottom out for depth and the press wheels are lifted off the ground and are unable to close the furrow. This leaves several feet of seeded area across a ditch or terrace that is blanked out due to poor seed to soil contact.

A press wheel or firmer wheel is a wheel attachment on an agricultural unit for compacting the soil in the seeded furrows after the soil has been planted and, in some instances, after a closing wheel has deposited loose soil overtop of the seed. Traditional press wheels compress the furrow to establish an environment conducive to good germination. Seed germination is promoted through appropriate soil compaction by minimizing air pockets, thus improving the capillary action of the moisture in the soil as well as reducing wind erosion of the soil over the seed.

The information included in this Background section of the specification, including any references cited herein and any description or discussion thereof, is included for technical reference purposes only and is not to be regarded subject matter by which the scope of the invention as defined in the claims is to be bound.

SUMMARY

A typical agriculture planter may include a draw bar to which a number of row units are attached. The draw bar may include a connection structure, such as a hitch tongue, extending forward from the planter frame for attachment to a tractor that pulls the planter. Each row unit my include a planter frame, a seed hopper, and a trailing assembly. The trailing assembly may be coupled to a rear portion of the planter frame via a linkage and extend rearward from the planter frame, and include separate, but adjustable, trailing arm assemblies for various opening implements and closing implements.

In one implementation, a trailing assembly for an agricultural planter is attached to a frame element of the agricultural planter with a mounting bracket. A walking beam having a hub at an intermediate position along a length of the walking beam is pivotably attached to the mounting bracket. A first pair of arms extends from the hub in a first direction, with each arm configured with a shaft to rotatably and selectively receive a first rotating implement, for example, a closing wheel or a fertilizer opener disc. A second pair of arms extends from the hub in a second direction parallel to each other and spaced apart from each other. Distal ends of the second pair of arms are configured to rotatably and selectively receive and support opposing ends of an axle of another rotating implement, for example, a press wheel, positioned between the second set of arms.

In another example, a trailing assembly for an agricultural planter is disclosed. The trailing assembly includes a mounting bracket configured for attachment to a frame element of the agricultural planter. The trailing assembly further includes a walking beam defining a hub at an intermediate position along a length of the walking beam. The hub is pivotably attached to the mounting bracket. The walking beam further includes a first arm and a second arm fixed to the hub adjacent to each other at first attachment ends and extending away from the hub in a first direction to second mounting ends. The walking beam further includes a first shaft positioned proximal to the second attachment end of the first arm and configured to rotatably and selectively receive a first rotating implement. The walking beam further includes a second shaft positioned proximal to the second attachment end of the second arm and configured to rotatably and selectively receive a second rotating implement. The walking beam further includes a third arm and a fourth arm fixed to the hub adjacent to each other at first connection ends and extending away from the hub in a second direction to second stay ends. The third arm and the fourth arm are fixed to a different side of the hub from the first arm and the second arm. The second stay ends are parallel to each other and define a space between each other. The second stay ends are configured to rotatably and selectively receive and support opposing ends of an axle of a third rotating implement positioned between the third arm and the fourth arm.

In another example, the trailing assembly further includes a parallel linkage pivotably connecting the mounting bracket to the frame element.

In another example, at least one of the first rotating implement and the second rotating implement includes a closing wheel.

In another example, at least one of the first rotating implement and the second rotating implement includes a fertilizer opener discs. Further, the trailing assembly may include a fertilizer injection tube positioned behind the fertilizer opener disc.

In another example, the third rotating implement includes a press wheel. The press wheel may include a hub which rotates about an axis of the axle. The press wheel may further include a rim extending generally radially from the axis and defining a circumferential portion. The press wheel may further include a plurality of tread portions connected to the rim along the circumferential portion and defining voids between adjacent tread portions.

In another example, each of tread portions include a tine having a first tine portion extending from a first side of the rim and a second tine portion extending from a second side of the rim. The first tine and the second tine portions may form a V-shaped pattern.

In another example, the walking beam may be pivotably coupled to the mounting bracket such that a pivoted displacement of the first or second implement causes a pivoted displacement of the press wheel. The pivoted displacement of the first implement or the second implement may be in a first direction. Further, the walking beam may be configured so that when the hub is joined to the mounting bracket, the pivoted displacement of the first implement or the second implement in the first direction causes a pivoted displacement of the press wheel in a second direction opposite the first direction.

In another example, a trailing assembly for an agricultural planter is disclosed. The trailing assembly includes a mounting bracket configured for attachment to a frame element of the agricultural planter. The trailing assembly further includes a walking beam defining a hub at an intermediate position along a length of the walking beam. The hub is pivotably attached to the mounting bracket. The walking beam includes a first arm and a second arm each extending from a first portion of the hub. The walking beam further includes a third arm and a fourth arm each extending from a second portion of the hub and generally away from the first arm and the second arm. The trailing assembly further includes a first closing wheel rotatably coupled with a first mounting end of the first arm. The trailing assembly further includes a second closing wheel rotatably coupled with a second mounting end of the second arm. The trailing assembly further includes a press wheel rotatably coupled with the third arm and the fourth arm using an axle extending between a third mounting end of the third arm and a fourth mounting end of the fourth arm.

In another example, the trailing assembly may include a parallel linkage pivotably connecting the mounting bracket to the frame element. Additionally or alternatively, the trailing assembly may include a closing system pivotally connecting the walking beam and the mounting bracket at a single pivot.

In another example, the press wheel may be coupled between the third arm and the fourth arm. The third arm and the fourth arm include apertures. The press wheel may be selectively coupled to the third arm and the fourth using the apertures to define a height of the press wheel in the assembly.

In another example, the walking beam may be pivotally coupled to the mounting bracket such that a pivoted displacement of the first closing wheel or the second closing wheel causes a pivoted displacement of the press wheel. Further, the first closing wheel and the second closing wheel may be arranged relative to one another to define a V-shape.

In another example, one or both of the first closing wheel and the second closing wheel include a plurality of tread portions extending away from a circumferential portion of the respective one of the first closing wheel or the second closing wheel. In some cases, the plurality of tread portions may extend angularly away from a center plane of the respective one of the first closing wheel or the second closing wheel.

In another example, the press wheel may include a plurality of tines extending away from a center plane of the press wheel. The plurality of tines may have voids between adjacent tines, which in response to the press wheel rotating operably places consecutive adjacent tines proximal to a ground surface.

In another example, an agricultural planter is disclosed. The agricultural planter includes a walking beam. The walking beam includes a first arm, a second arm, and a press wheel arm section. Each of the first arm, the second arm and the press wheel section extend away from a pivotal coupling of the walking beam with a bracket or mount of the agricultural planter. The agricultural planter further includes a first rotating implement rotatably coupled to the first arm. The agricultural planter further includes a second rotating implement rotatably coupled to the second arm. The agricultural planter further includes a press wheel rotatably coupled with the press wheel section.

In another example, one or both of the first rotating implement and the second rotating implement includes fertilizer opener discs. In this regard, the agricultural planter may further include a fertilizer system configured to deliver liquid fertilizer to a ground surface post-contact with the first rotating implement or the second rotating implement and pre-contact with the press wheel.

In another example, the fertilizer system may be coupled with a mounting bracket of the trailing arm assembly. The fertilizer system may further include a fertilizer delivery tube positioned between the first rotating implement or the second rotating implement and the press wheel. In some cases, the fertilizer delivery tube may be a first fertilizer delivery tube positioned between the first rotating implement and the press wheel. In this regard, the fertilizer system may further include a second fertilizer delivery tube positioned between the second rotating implement and the press wheel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements, and in which.

6

Figure 11A:
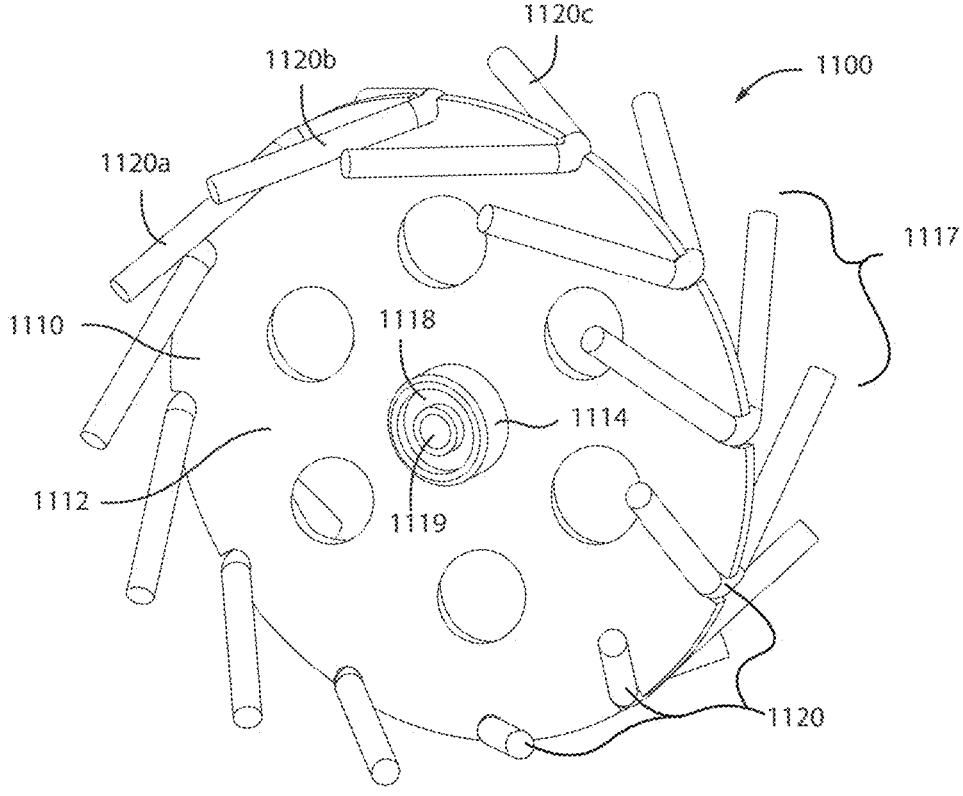
FIG. 11A illustrates a perspective view of a symmetric press wheel in accordance with an embodiment of the present invention.
Figures 11B, 11C:
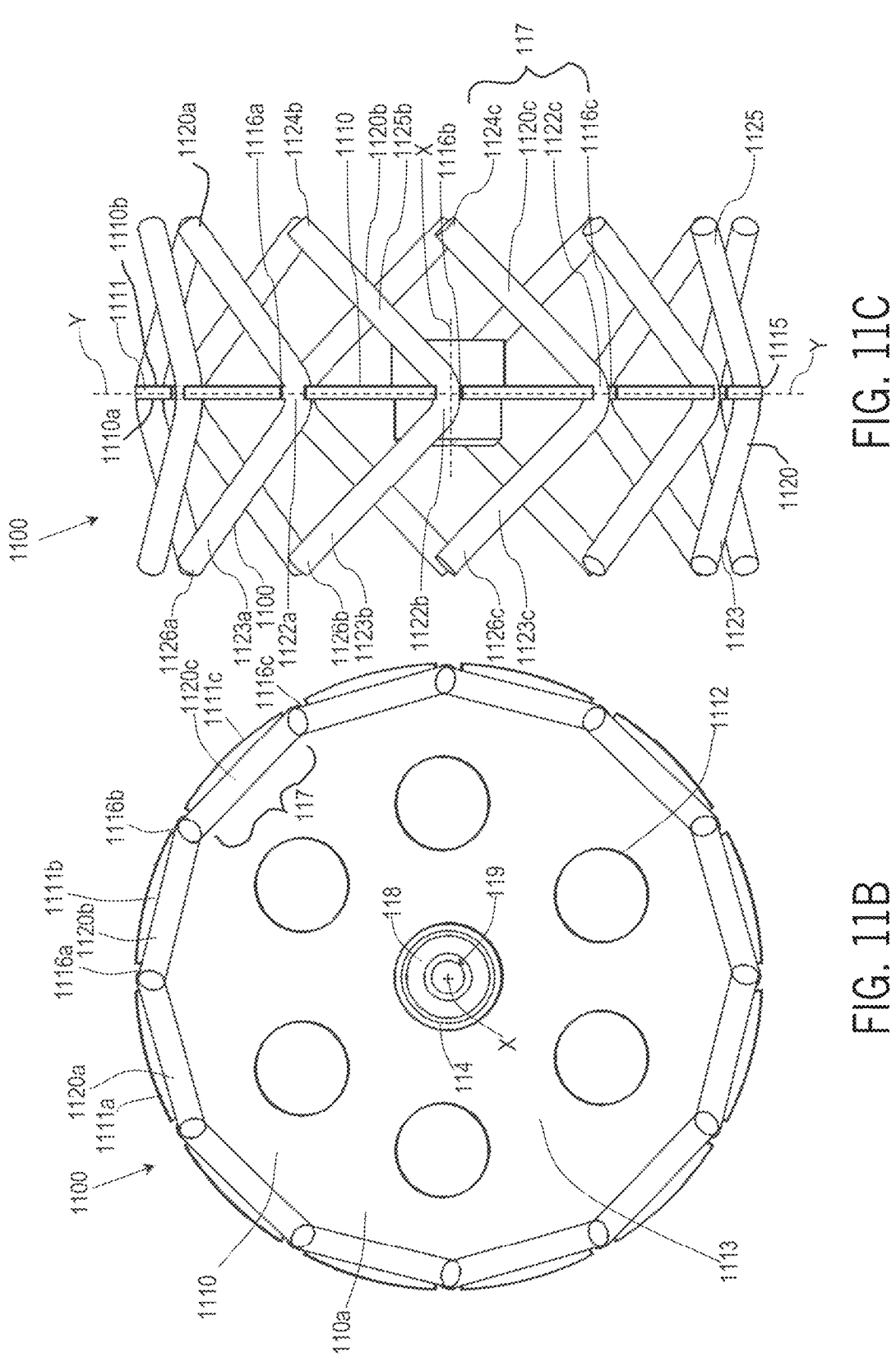

FIG. 11B illustrates a side view of the press wheel shown in FIG. 11A.

FIG. 11C illustrates a front view of the press wheel shown in FIG. 11A.

Figure 12A:
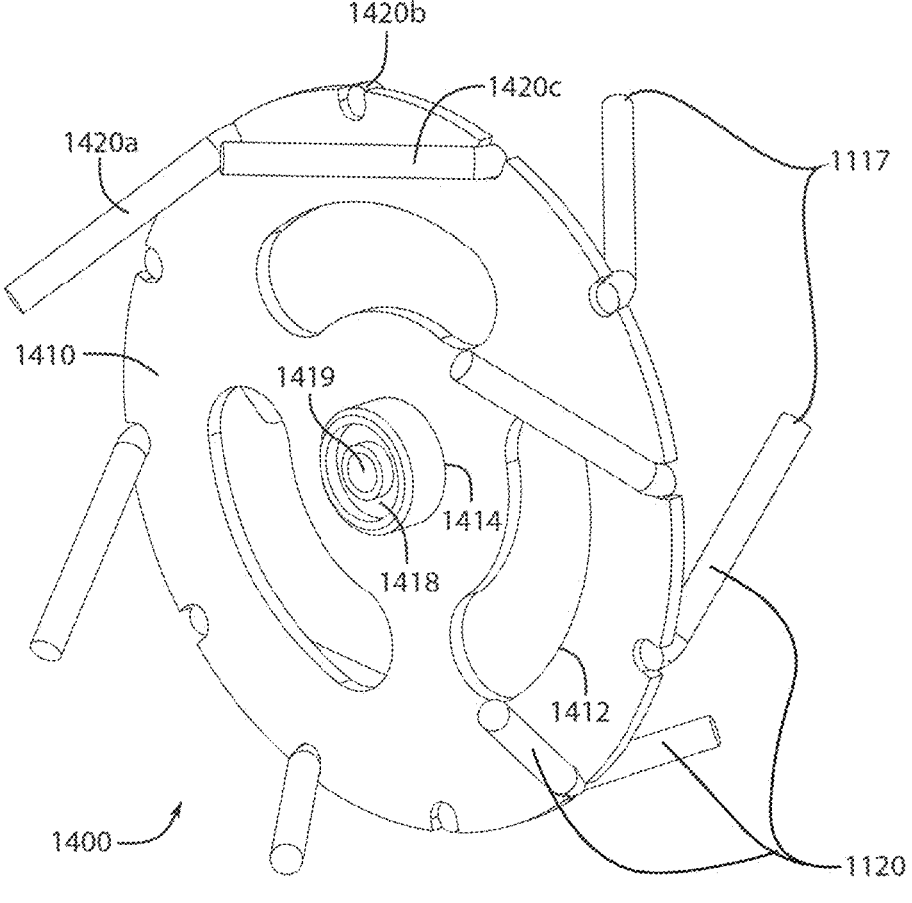
Figures 12B, 12C:
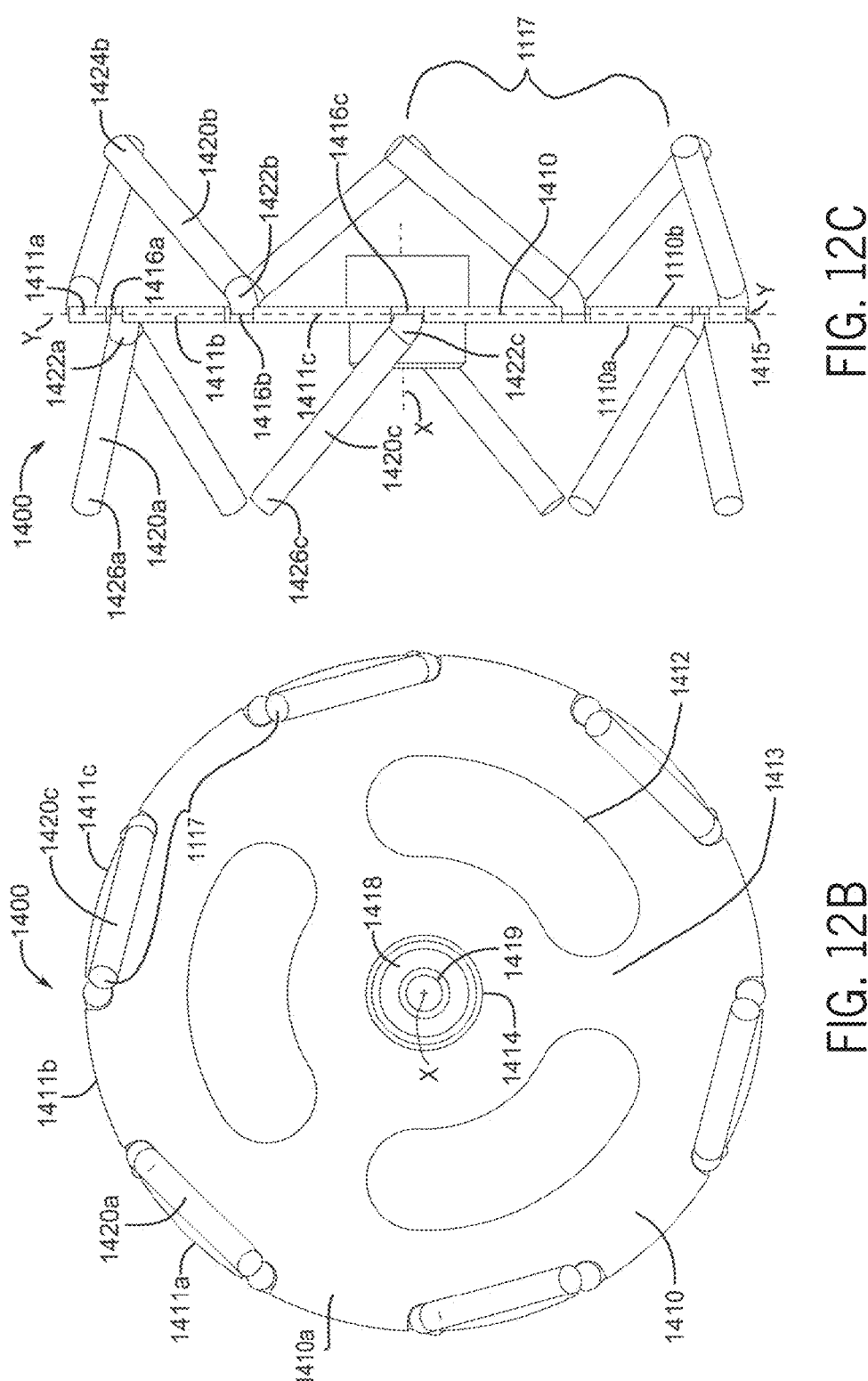

FIG. 12A illustrates a perspective view of an alternating tine press wheel in accordance with an embodiment of the present invention FIG. 12B illustrates a side view of the press wheel press wheel shown in FIG. 12A.

FIG. 12C illustrates a front view of the press wheel shown in FIG. 12A.

FIG. 13A-F illustrate perspective views and front views of various embodiments of the press wheel rims without tines extending therefrom, particularly showing embodiments of the radial surface or edge of the press wheel rims.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

Figure 1:
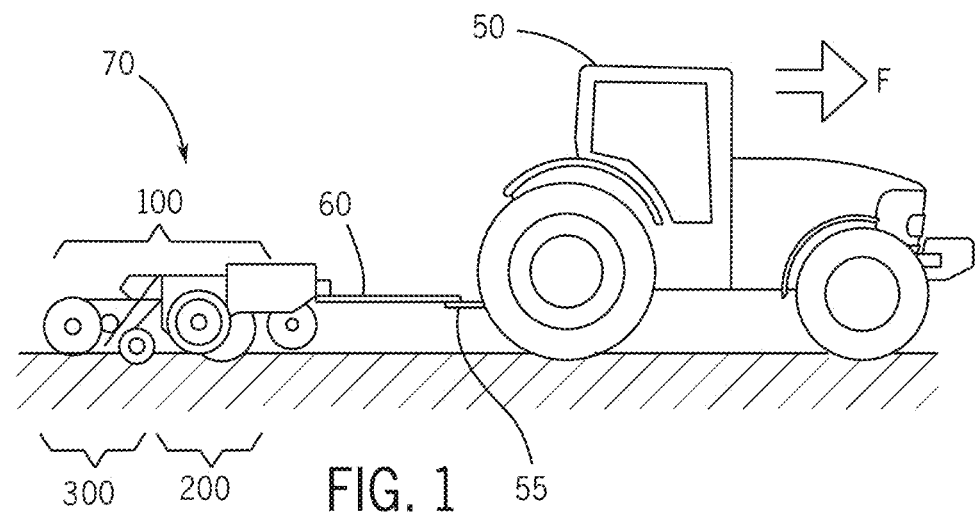
FIG. 1 illustrates a side elevation view of an agriculture tractor pulling an agriculture planter.
Figure 2:
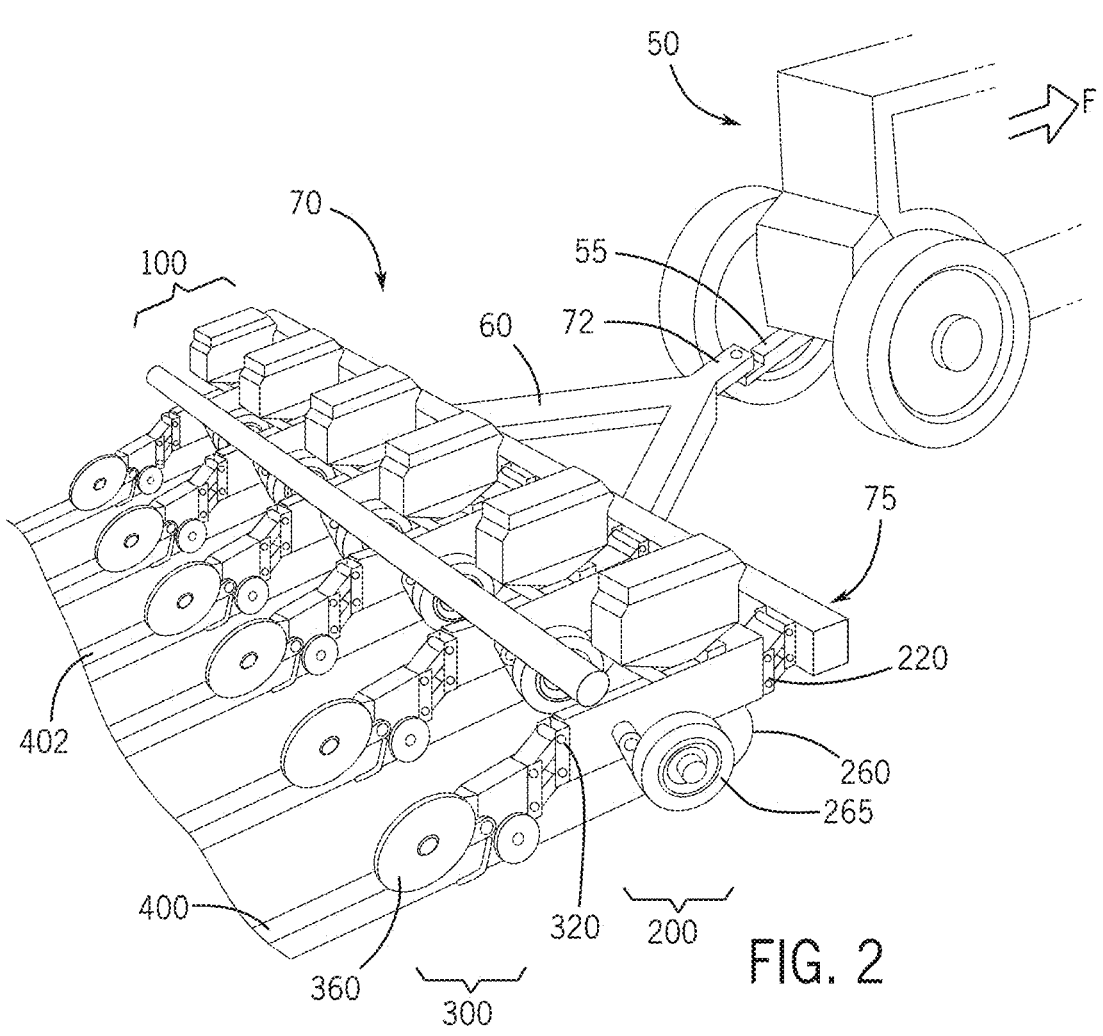
FIG. 2 illustrates a top-rear isometric view of the planter.

An exemplary embodiment of an agriculture planter 70 having one or more trailing arm assemblies 100 attached to an agricultural tractor 50 is shown in FIGS. 1 and 2. The agricultural tractor 50 may have a hitch receiver 55 extending rearward therefrom. As illustrated in FIG. 2, the planter 70 may include a planter frame 75 from which a yoke 60 with a tongue or hitch 72 extends in a forward direction. The hitch 72 connects with the hitch receiver 55 to couple the planter 70 to the tractor 50. Various planter components are supported on the planter frame 75 and extend therefrom in a rearward direction. The tractor 50 tows the planter 70 in the direction of arrow F and provides power to the planter 70 (e.g., via a power take off ("PTO"), not shown) for powering the operations of the planter 70. Additional operations of the planter 70 may be powered by hydraulics or electrical motors (not shown) powered by the tractor 50.

Components of the planter 70 may include a plurality of trailing arm assemblies 100. The trailing arm assemblies 100 may function as row units for planting seeds and distributing liquid fertilizer. Each trailing arm assembly 100 may have a planter frame 60 or yoke that extends from the front of the trailing arm assembly 100. Each trailing arm assembly 100 may be equipped with a furrow opener assembly 200. Each trailing arm assembly 100 may also be equipped with a trailing furrow closer assembly 300.

In the exemplary embodiment shown, the furrow opener assembly 200 may be connected to the planter frame 60 via a parallel linkage 220, such as a four bar parallel linkage. The parallel linkage 220 allow the furrow opener assembly 200 and the furrow closer assembly 300 to move vertically to follow the terrain (e.g., contours of the field), overcome obstacles (e.g., debris or the like), or otherwise negotiate similar changes in a surface 400 of a field. The furrow opener assembly 200 may include a guide wheel 265 and an opener disc 260. The furrow closer assembly 300 may include one or more closer wheels 360. In some embodiments, the furrow closer assembly 300 may further include a separate fertilizer opener wheel and a fertilizer dispenser (not shown). The vertical movement provided by the four bar linkage allows the trailing arm assemblies 100 to follow or translate up and down as the opener discs 260 and closer wheels 360 negotiate over or through an obstruction in a field surface 400 without adversely impacting seed deposit depth or resulting in damage to the components of the agricultural planter 70.

Because the trailing arm assemblies 100 are able to adjust to the contours of and variances in the field surface 400 through vertical translation via the parallel linkage 220, the opener discs 260 may be in consistent contact with the field surface 400, which may improve opening of furrows 402. Similarly, the trailing furrow closer wheels 360 may be in consistent contact with the field surface 400, which improves closing of the seed and fertilizer furrows 402.

Figure 3:
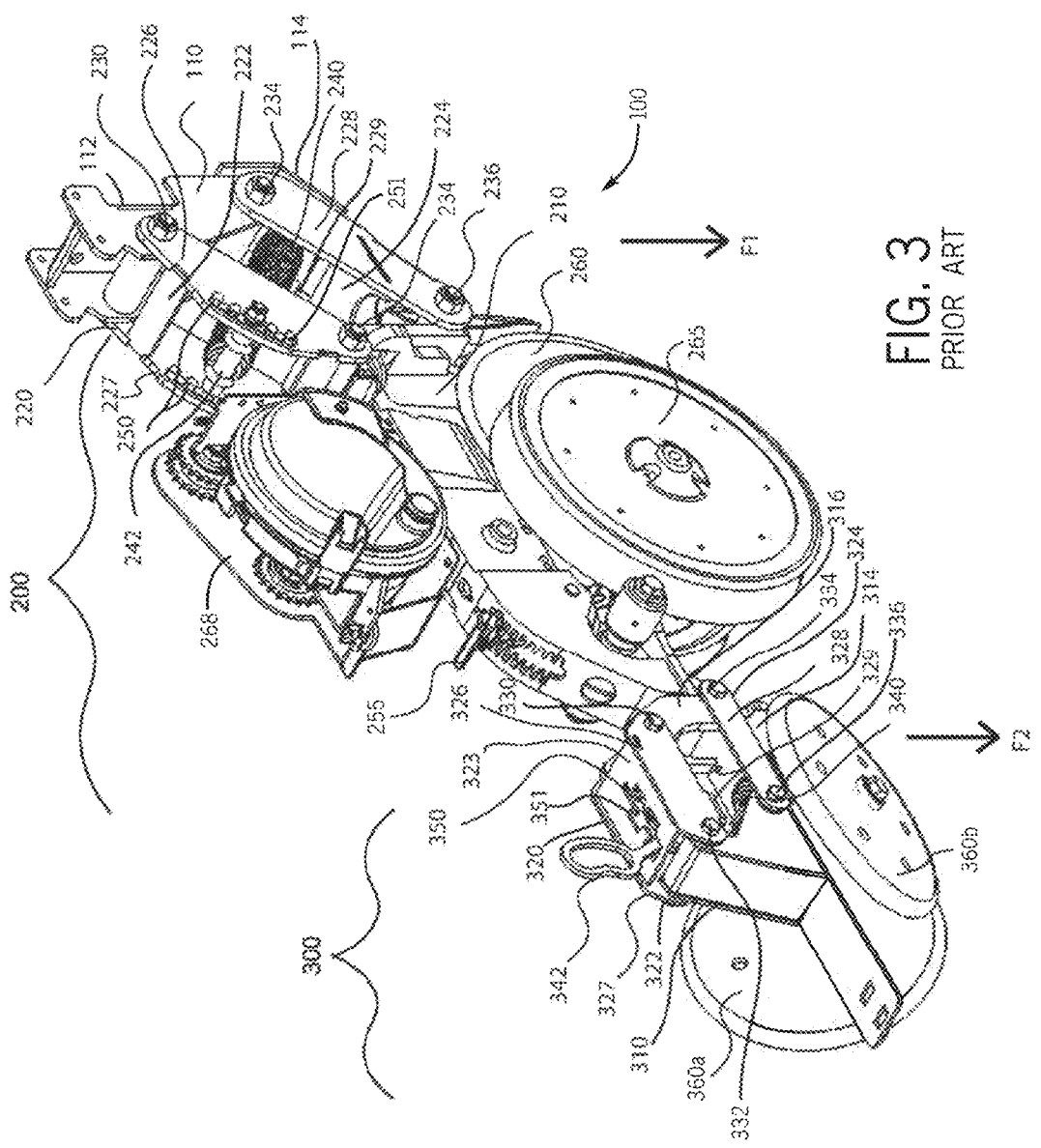
FIG. 3 illustrates a top-rear isometric view of a prior art trailing arm assembly forming part of the planter.
Figure 4:
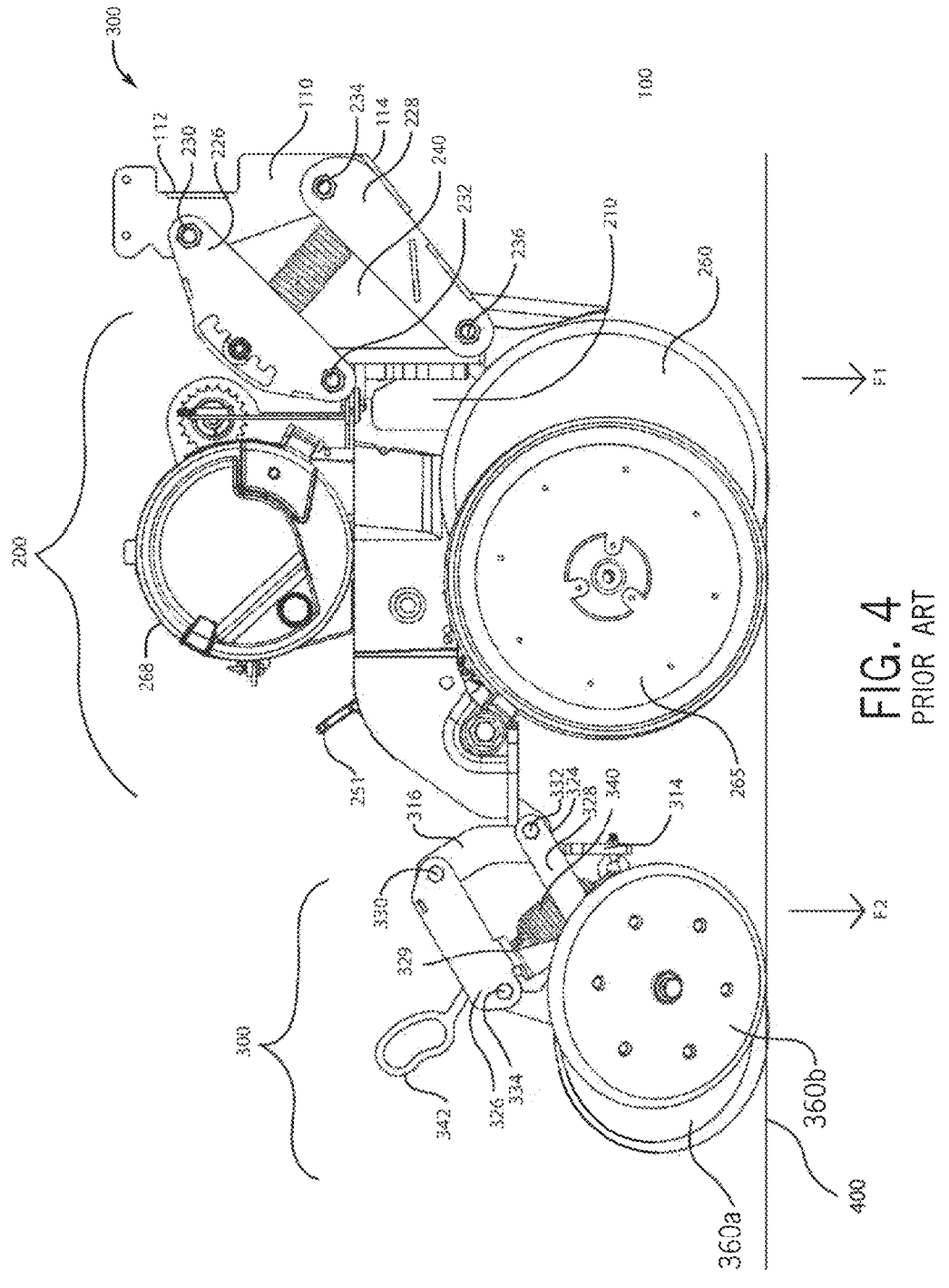
FIG. 4 illustrates a side elevation view of the prior art trailing arm assembly of FIG. 3.

Exemplary embodiments of a typical trailing arm assembly 100 are depicted in FIGS. 3 and 4. FIGS. 3 and 4 are prior art depictions of the trailing arm assembly 100 with a furrow opener assembly 200 and a furrow closer assembly 300. This embodiment is shown and described for reference purposes. The furrow opener assembly 200 of the trailing arm assembly 100 may include an opener frame 210. One or more furrow opener discs 260, a gauge wheel 265, a seed hopper 268, and a fertilizer reservoir (not shown) may be attached to the opener frame 210. Each seed furrow opener disc 260 creates a furrow in which the planter 70 deposits seed in a manner well known in the art. The gauge wheel 265 assists in determining the depth at which the planter opener assembly 200 deposits the seed. The gauge wheel 265 is mounted to the frame 210 via a gauge wheel lever arm, which is pivotally coupled to the frame 210.

The furrow opener assembly 200 may be coupled to the planter frame 75 via a connection that allows the trailing arm assembly 100 to move relative to the frame 75. In any of the embodiments contemplated herein, the connection may be configured to maintain an approximately constant relative orientation between the furrow opener assembly 200 and the frame 75 through the range of motion of the trailing arm assembly 100. Any mechanical connection operable to maintain this relationship may be used. For example, the furrow opener assembly 200 may connect to the frame 75 via a parallel linkage 220. In any of the embodiments disclosed herein, the parallel linkage 220 may be a four bar parallel linkage. While a four bar parallel linkage 220 is shown in the figures, other connection mechanisms may be used as well. In other implementations, which may be used in any embodiment, a slide mechanism or a rail mechanism may connect the furrow opener assembly 200 of the trailing arm assembly 100 to the frame 75.

In any of the embodiments disclosed herein, the furrow closer assembly 300 may include a closer frame 310. The closer frame 310 may be connected to one or more furrow closer discs 360 or wheels, fertilizer opener discs, fertilizer injectors, or similar planter implements. Each furrow closer disc 360 closes a furrow over a deposited seed in a manner well known in the art. Any type of closer discs 360 may be used including flat discs, discs with tamping appendages, tires, and "Mohawk"-style discs, as well as others.

The furrow closer assembly 300 may be coupled to the opener frame 210 via a connection that allows the furrow closer assembly 300 to move relative to the opener frame 210. In any of the embodiments described herein, the connection may be configured to maintain an approximately constant relative orientation between the furrow closer assembly 300 and the opener frame 210 through the range of motion of the furrow closer assembly 300. Substantially any mechanical connection operable to maintain this relationship may be used. For example, the furrow closer assembly 300 may connect to the opener frame 210 via a parallel linkage 320. In the embodiments contemplated herein, the parallel linkage 320 may be a four bar parallel linkage. While a four bar parallel linkage is shown in the figures connecting the furrow closer assembly 300 to the opener frame 210, other connection mechanisms may be used as well. For example, a slide mechanism or a rail mechanism may be used in alternate embodiments.

The parallel linkages 220 coupled between each furrow opener assembly 200 and the planter frame 75 may have a first opener linking bar 226 and a second opener linking bar 228 arranged parallel to the first opener linking bar 226. The first opener linking bar 226 may be pivotably connected at a first end on a first opener pivot bearing 230 to a frame bracket 110 that is rigidly fixed (either permanently or removably) to the planter frame 75. The first opener linking bar 226 may be pivotably connected at a second end on a second opener pivot bearing 232 to the opener frame 210 of the furrow opener assembly 200. In this arrangement, the first opener linking bar 226 allows movement between the first frame 210 and the frame bracket 110. The second opener linking bar 228 may be pivotably connected at a first end on a third opener pivot bearing 234 to the frame bracket 110 that is rigidly fixed to the planter frame 75. The second opener linking bar 226 may be pivotably connected at a second end on a fourth opener pivot bearing 236 to the opener frame 210 of the furrow opener assembly 200.

The first opener linking bar 226 and the second opener linking bar 228 may be positioned in parallel relative to one another such that planes passing through the first and second opener pivot bearings 230, 232 and the third and fourth opener pivot bearings 234, 236, respectively, are parallel to one another. In this relationship, as the first opener linking bar 226 and the second opener linking bar 228 articulate through their range of motion, they remain parallel to one another.

In any embodiment, for example, as shown in FIG. 3, the parallel linkage 220 may also include a third opener linking bar 227 and a fourth opener linking bar 229 that are spaced apart from the first opener linking bar 226 and the second opener linking bar 228, respectively, and are positioned as mirror opposites thereof. The third opener linking bar 227 and the fourth opener linking bar 229 may be attached to the frame bracket 110 at first ends and to the opener frame 210 at second ends on pivot bearings located on the same axes as the pivot axes of the first, second, third, and fourth opener pivot bearings 230, 232, 234, 236, respectively. In any embodiment, the first and second opener pivot bearings 230, 232 may be shafts supported by the frame bracket 110 or the opener frame 210 to extend between and support both the first opener linking bar 226 and the third opener linking bar 227. Similarly, in any embodiment, the third and fourth opener pivot bearings 234, 236 may be shafts supported by the frame bracket 110 or the opener frame 210 to extend between and support both the second opener linking bar 228 and the fourth opener linking bar 229.

In any contemplated implementation, the first opener linking bar 226 and the third opener linking bar 227 of the parallel linkage 220 may be rigidly connected, for example, welded together with a cross-brace 222 to form a unitary structure. Similarly, the second opener linking bar 228 and the fourth opener linking bar 229 may be rigidly connected, for example, welded together with a cross-brace 224 to form a unitary structure. Such unitary formation may increase the lateral rigidity of the parallel linkage 220. The unitary formation of either or both the upper and lower opener linking bars 226, 227, 228, 229 may be accomplished by means other than cross bracing. For example, each pair of linking bars may be cast, molded, machined, stamped, welded, or formed together by any other method as a single piece. In any embodiment, the frame bracket 110 may have an engagement portion 112 that is fixedly attachable or removably attachable to a planter towing frame 75. The engagement portion 112 may provide stability proximal to the sides of the linkage 220 such that twisting of the trailing arm assembly 100 is minimized.

In the embodiment of FIGS. 3 and 4, the frame bracket 110 of the furrow opener assembly 200 may also include a mounting plate 114 positioned adjacent to or below the third opener pivot bearing 234 and adjacent to or between the second opener linking bar 228 and the fourth opener linking bar 229. As shown in FIGS. 3 and 4, the mounting plate 114 may be below the third opener pivot bearing 234 and also extend or bend under the second opener linking bar 228 and the fourth opener linking bar 229. By extending outward and under the second opener linking bar 228 and the fourth opener linking bar 229, the mounting plate 114 may be positioned to stop the parallel linkage 220 from allowing rotation beyond a certain point. For example, the mounting plate 114 may limit the second opener linking bar 228 and the fourth opener linking bar 229 from extending beyond 10-80 degrees off of the horizontal plane by being positioned to contact the second opener linking bar 228 and the fourth opener linking bar 229 at an angular orientation between 20-70 degrees off horizontal. In other examples, the angle of the mounting plate 114 may be between 20-70 degrees or more particularly between 30-60 degrees. In one example, the angle of the mounting plate 114 may be approximately 35 degrees with respect to the horizontal.

It is desirable that the trailing arms 100 provide a relatively constant downward pressure. Such a constant and consistent downward pressure allows for continuous opening and closing of furrows 402 and provides a consistent seed depth, preventing seed deposition from being too shallow or too deep, each of which negatively impacts germination. In the embodiment of FIGS. 3 and 4, a biasing member 240 is mounted between the parallel linkage 220 and the planter frame 75. In various known embodiments, the biasing member can be a tension spring, a torsion spring positioned around the third opener pivot bearing 234, or a hydraulic or pneumatic cylinder operable to extend or contract. In the embodiment shown, the biasing member 240 is a heavy gauge tension spring that is connected at a first end to the first opener linking bar 226 and the third opener linking bar 227 of the parallel linkage 220 and at a second end to the mounting plate 114. In this manner, the second end of the biasing member 240 has little or no movement relative to the planter frame 75. In some embodiments, the first end of the biasing member 240 may be connected to the cross brace 222 extending between the first opener linking bar 226 and the third opener linking bar 227 forming a unitary upper bar of the parallel linkage 220. In other embodiments, as shown in FIGS. 3 and 4, the first end of the biasing member 240 may be connected to a separate anchor bar 242 that extends between the first opener linking bar 226 and the third opener linking bar 227. The position of the anchor bar 242 may be adjustable as further described below.

The biasing member 240 may exert a force directly between the parallel linkage 220 and the mounting plate 114, with a resultant force on the opener frame 210 of the furrow opener assembly 200 represented as F1, i.e., downward and effectively normal to the surface of the field 400, regardless of the pitch of slope of the field at any particular location. The parallel linkage 220 is connected between the opener frame 210 and the frame bracket 110 such that the parallel linkage 220 maintains an angular orientation of the opener frame 210 with respect to the planter frame 75. This angular orientation may be generally or substantially orthogonal to the effective downward force F1 of the adjustable biasing member 240. While the actual force exerted by the biasing member 240 may not be entirely downward or normal to the field 400 as indicated in FIGS. 3 and 4, the interaction between the biasing member 240 and the parallel linkage 220 may result in a primarily downward force on the opener frame 210. This downward force may counteract upward forces on the furrow opener assembly (e.g., rocks, hard pack soil, ridges, or humps in the field 400). The biasing member 240 thereby helps maintain a downward force (in addition to the weight of the furrow opener assembly 200) on the opener frame 210 and all implements attached thereto (e.g., the opener wheel 260 and the gauge wheel 265) against the ground 400.

As noted, in any of the embodiments, the position of the first end of the biasing member 240 may be adjustable along a length of the upper portion of the parallel linkage 220. The adjustment in position of the first end of the biasing member 240 (e.g., when a tension spring) allows for the resting tension on the parallel linkage 220 to be increased or decreased. For example, as shown in FIGS. 3 and 4, the anchor bar 242 may connect to the parallel linkage 220 at any of a variety of positions along about 50% of the lengths of the first linking bar 226 and the third linking bar 227. As shown, elongate slots 250 may be formed in the walls of the first linking bar 226 and the third linking bar 227 into which lateral ends of the anchor bar 242 are positioned. A bottom surface of the elongate slots 250 may be formed as a plurality of detents 251. The lateral ends of the anchor bar 242 may engage the elongate slots 250 and seat within any opposing pair of detents 251. The anchor bar 242 may be sized to slide within and along the elongated slot between the detents 251. The biasing member 240 pulls on the anchor bar 242 and holds it in place in a selected pair of detents 251 in the slots 250. The anchor bar 242 may be a shaft or rod or pin that extends between the first linking bar 226 and the third linking bar 227.

A closing system coupler 254 may be formed to extend from the rear of the opener frame. In any embodiment contemplated herein, the opener frame 210 may include an adjustment mechanism 255 operable to change the position of the gauge wheel 265 relative to the opener frame 210. The adjustment mechanism 255 may be operated by an handle or lever to raise or lower the gauge wheel 265. In some embodiments, as shown, the lever for the adjustment mechanism 255 may extend through an opening in the closing system coupler 254. A linkage may extend between a bottom end of the lever and the opener frame 210. The position of the adjustment mechanism 255 may be configured to set the gauge wheel 265 at a desired position relative to the opener frame 210. The adjustment mechanism 255 thus sets the depth of furrows 402 created by the opener disc 260 by adjusting the vertical position of the gauge wheel 265 relative to the opener frame 210 and the opener disc 260. The position of the gauge wheel 265 also affects the static position of the opener frame 210 with respect to the planter frame 75 and thus can affect the tension exerted by the biasing member 240.

The trailing arm assembly 100 may also include a furrow closer assembly 300 that supports implements operable to close and/or fertilize a furrow 402. As shown in FIGS. 3 and 4, the furrow closer assembly 300 may include a closer frame 310. The opener frame 210 and the closer frame 310 may be connected to one another such that the closer frame 310 may operatively move independently with respect to the opener frame 210 such that the furrow closer assembly 300 may articulate vertically relative to the opener trailing arm assembly 200. One or more closing wheels 360 may be rotationally mounted to the closer frame 310. The closing wheels 360 may generally operate at a similar level as the gauge wheels 265 to close the furrows 402 rather than at the lower depth of the opener disc 260 that cuts the furrows 402. In some embodiments (not shown herein), the closer frame 310 may also support a fertilizer disc and/or a fertilizer distribution system.

In any of the embodiments disclosed herein, the closer frame 310 may be connected to the closing system coupler 254 on the opener frame 210 via a second parallel linkage 320. The second parallel linkage 320 may have a first closer linking bar 326 and a second closer linking bar 328. The first closer linking bar 326 may be pivotably connected at a first end on a first closer pivot bearing 330 to the opener frame 210. The first closer linking bar 326 may be pivotably connected at a second end on a second closer pivot bearing 332 to the closer frame 310. In this arrangement, the first closer linking bar 326 allows movement between the opener frame 210 and the closer frame 310. The second closer linking bar 328 may be pivotably connected at a first end on a third closer pivot bearing 334 to the opener frame 210. The second closer linking bar 326 may be pivotably connected at a second end on a fourth closer pivot bearing 336 to the closer frame 310.

The first closer linking bar 326 and the second closer linking bar 328 may be positioned in parallel relative to one another such that planes passing through the first and second closer pivot bearings 330, 332 and the third and fourth closer pivot bearings 334, 336, respectively, are parallel to one another. In this relationship, as the first closer linking bar 326 and the second closer linking bar 328 articulate through their range of motion, they remain parallel to one another. The parallel linkage 220 of the furrow opener assembly 200 provides a first degree of articulation for movement of the components positioned rearward of furrow opener assembly 200, e.g. the closing assembly 300. The second parallel linkage 320 of the closing assembly 300 provides a second degree of articulation that is independent of the opener assembly 200 and provides additional vertical range of movement for the closing wheels 360a, 360b.

In any embodiment, for example, as shown in FIG. 3, the second parallel linkage 320 may also include a third closer linking bar 327 and a fourth closer linking bar 329 that are spaced apart from the first closer linking bar 326 and the second closer linking bar 328, respectively, and are positioned as mirror opposites thereof. The third closer linking bar 327 and the fourth closer linking bar 329 may be attached to the opener frame 210 at first ends and to the closer frame 310 at second ends on pivot bearings located on the same axes as the pivot axes of the first, second, third, and fourth closer pivot bearings 330, 332, 334, 336, respectively. In any embodiment, the first and second closer pivot bearings 330, 332 may be shafts supported by the opener frame 210 to extend between and support both the first closer linking bar 326 and the third closer linking bar 327. Similarly, in any embodiment, the third and fourth closer pivot bearings 334, 336 may be shafts supported by the closer frame 310 to extend between and support both the second closer linking bar 328 and the fourth closer linking bar 329.

In the prior art embodiment shown in FIGS. 3 and 4, the closer frame 310 may include a closer mounting bracket 316 fixedly attached or removably attachable to the opener frame 210. The closer frame 310 may be movably attached to the closer mounting bracket 316 via the second parallel linkage 320, preferably in a manner that provides stability to the sides of the second parallel linkage 320 to minimize twisting of the furrow closer assembly 300. The closer mounting bracket 316 may also include a closer mounting plate 314 that connects to a biasing member 340. The closer mounting plate 314 may be located above, below, or in between pivots 330 and 332. As shown in FIGS. 3 and 4, the closer mounting plate 314 may be below the third closer pivot 334 and also extend downward beyond or bend under the second closer linking bar 328 and the fourth closer linking bar 329. By extending outward and under the second linking bar 328 and the fourth linking bar 329, the closer mounting plate 314 may be positioned to stop the parallel linkage 320 from allowing rotation beyond a certain point. For example, the closer mounting plate 314 may limit the travel of the second closer linking bar 328 and the fourth closer linking bar 329 by being positioned to contact the second closer linking bar 328 and the fourth closer linking bar 329 at a chosen angular orientation.

In any contemplated implementation, the first closer linking bar 326 and the third closer linking bar 327 of the second parallel linkage 320 may be rigidly connected, for example, welded together with a cross-brace plate 322 to form a unitary structure. Similarly (although not presented in the figures), the second closer linking bar 328 and the fourth closer linking bar 329 may be rigidly connected, for example, welded together with a cross-brace to form a unitary structure. Such unitary formation may increase the lateral rigidity of the second parallel linkage 320. The unitary formation of either or both the upper and lower closer linking bars 326, 327, 328, 329 may be accomplished by means other than cross bracing. For example, each pair of linking bars may be cast, molded, machined, stamped, welded, or formed together by any other method as a single piece. In any embodiment, the closer mounting bracket 316 may be fixedly attached to (but generally removable from) the opener frame 210. The closer mounting bracket 316 may provide stability proximal to the sides of the second parallel linkage 320 such that twisting of the furrow closer assembly 300 is minimized. Further, the closer frame 310 may be formed as a rigid box structure that also provides external stability to the second parallel linkage 320 as the third and fourth closer pivot bearings 334, 336 are attached thereto.

In the prior art embodiment of FIGS. 3 and 4, a biasing member 340 is mounted between the parallel linkage 320 and the closer mounting plate 314 and, thus, with respect to the opener frame 210. In various known embodiments, the biasing member 340 can be a tension spring, a torsion spring positioned around the third closer pivot bearing 334, or a hydraulic or pneumatic cylinder operable to extend or contract. In the embodiment shown, the biasing member 340 is a heavy gauge tension spring that is connected at a first end to the first closer linking bar 326 and the third closer linking bar 327 of the second parallel linkage 320 and at a second end to the closer mounting plate 314. In this manner, the second end of the biasing member 340 has little or no movement relative to the opener frame 210. In some embodiments, the first end of the biasing member 340 may be connected to the cross brace plate 322 extending between the first closer linking bar 326 and the third closer linking bar 327 forming a unitary upper bar of the parallel linkage 320. In other embodiments, as shown in FIGS. 3 and 4, the first end of the biasing member 340 may be connected to a separate anchor lever 342 positioned between the first closer linking bar 226 and the third closer linking bar 227. The position of the anchor lever 342 may be adjustable as further described below.

The biasing member 340 may exert a force directly between the second parallel linkage 320 and the closer mounting plate 314, with a resultant force on the closer frame 210 of the furrow closer assembly 300 represented as F2, i.e., downward and effectively normal to the surface of the field 400, regardless of the pitch of slope of the field 400 at any particular location. The second parallel linkage 320 is connected between the closer frame 310 and the closer mounting bracket 314 such that the second parallel linkage 320 maintains an angular orientation of the furrow closer assembly 300 with respect to the opener frame 210. This angular orientation may be generally or substantially orthogonal to the effective downward force F2 of the biasing member 340. While the actual force exerted by the biasing member 340 may not be entirely downward or normal to the field 400 as indicated in FIGS. 3 and 4, the interaction between the biasing member 340 and the second parallel linkage 320 may result in a primarily downward force on the closer frame 310. This downward force may counteract upward forces on the furrow closer assembly 300 (e.g., rocks, hard pack soil, ridges, or humps in the field 400). The biasing member 340 thereby helps maintain a downward force (in addition to the weight of the furrow closer assembly 300) on the closer frame 310 and all implements attached thereto (e.g., the closer wheels 360) against the field 400.

As noted, in any of the embodiments, the position of the first end of the second biasing member 340 may be adjustable along a length of the upper portion of the second parallel linkage 320. The adjustment in position of the first end of the second biasing member 340 (e.g., when a tension spring) allows for the tension on the second parallel linkage 320 to be increased or decreased. For example, as shown in FIGS. 3 and 4, the anchor lever 342 may have an upper end with a handle and a lower end that connects with the first end of the second biasing member 340. A mid-portion of the anchor lever 342 may be pivotably mounted with respect to the second parallel linkage 320, e.g., mounted to rotate about the second closer pivot bearing 332 (not visible). The second closer pivot bearing thus acts as a fulcrum for the anchor lever 342 to increase or reduce the static tension on the second biasing member 340. The upper end of the anchor lever 342 may interface with the cross brace plate 322 on the second parallel linkage 320 at any of a variety of positions along about 50%-80% of the lengths of the first closer linking bar 326 and the third closer linking bar 327. As shown, an elongate slot 350 may be formed in the wall of the cross brace plate 322 within which the anchor lever 342 is positioned. The sides of the elongate slot 350 may be formed with a plurality of detents 351. The anchor lever 342 may engage the elongate slot 350 and seat within any detent 351 along the length of the elongate slot 350, pivoting about the second closer pivot bearing 332 and thus moving the lower end of the anchor lever 342 farther from or nearer to the closer mounting bracket 314, thereby increasing or decreasing tension in the second biasing member 340. The second biasing member 340 pulls on the anchor lever 342 and holds it in place in a selected detent 351 in the slot 350.

Figure 5A:
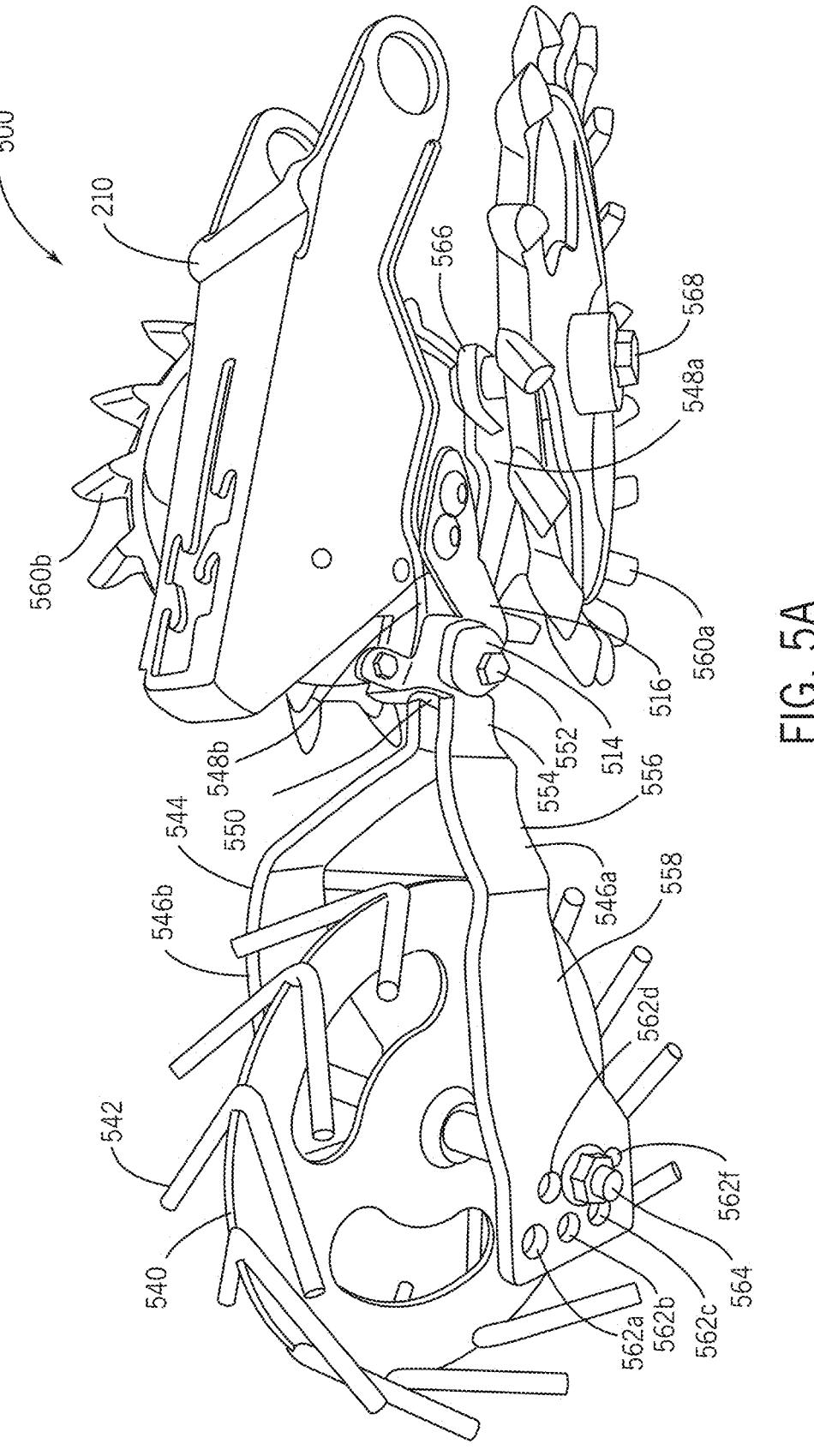
FIG. 5A illustrates a top, side, perspective view of an embodiment of a furrow closer assembly with a walking beam connecting a press wheel to a pair of closing wheels.
Figures 5B, 5C:
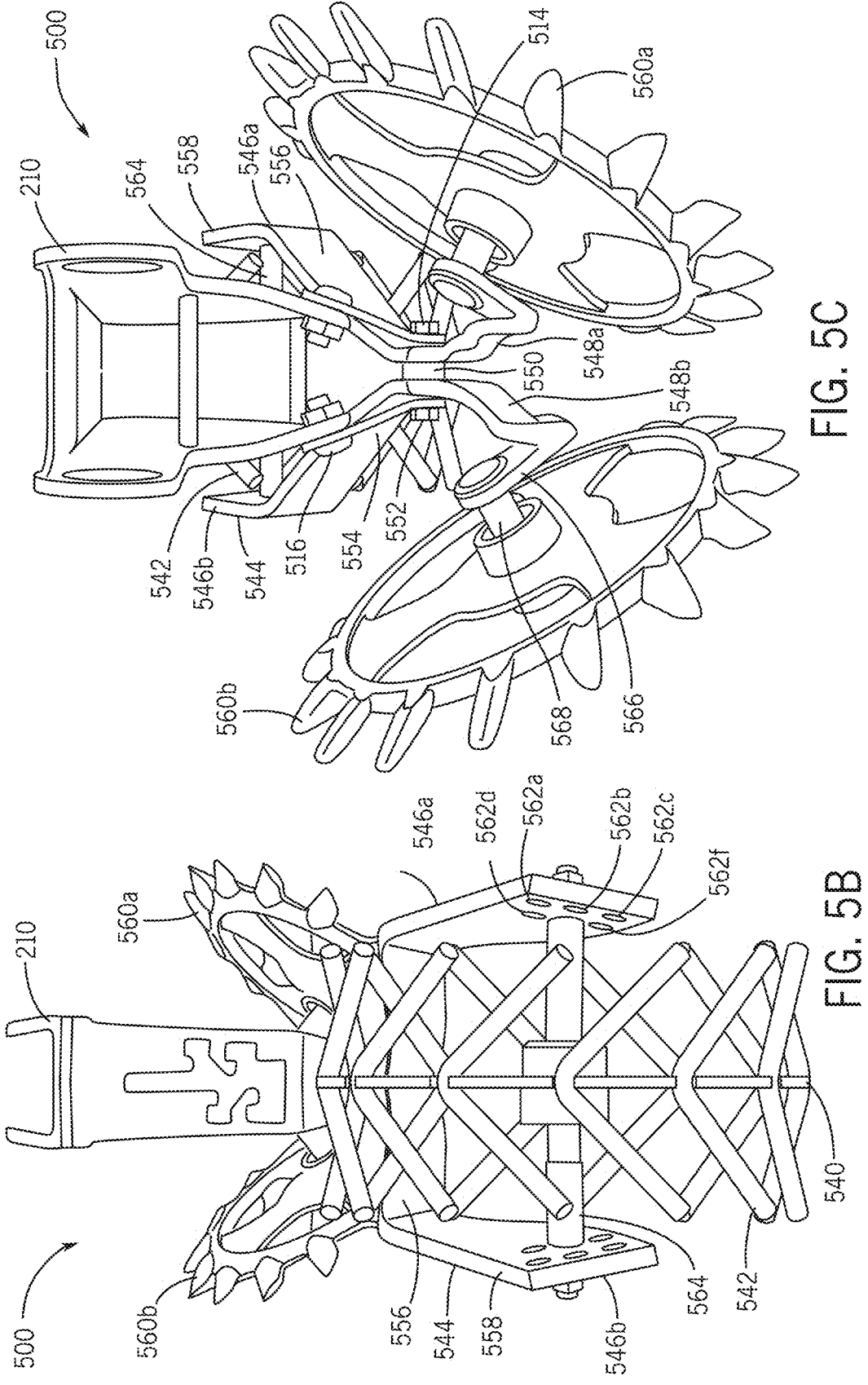
FIG. 5B illustrates a rear perspective view of the furrow closer assembly of FIG. 5A.
FIG. 5C illustrates a front perspective view of the furrow closer assembly of FIG. 5A.
Figure 6:
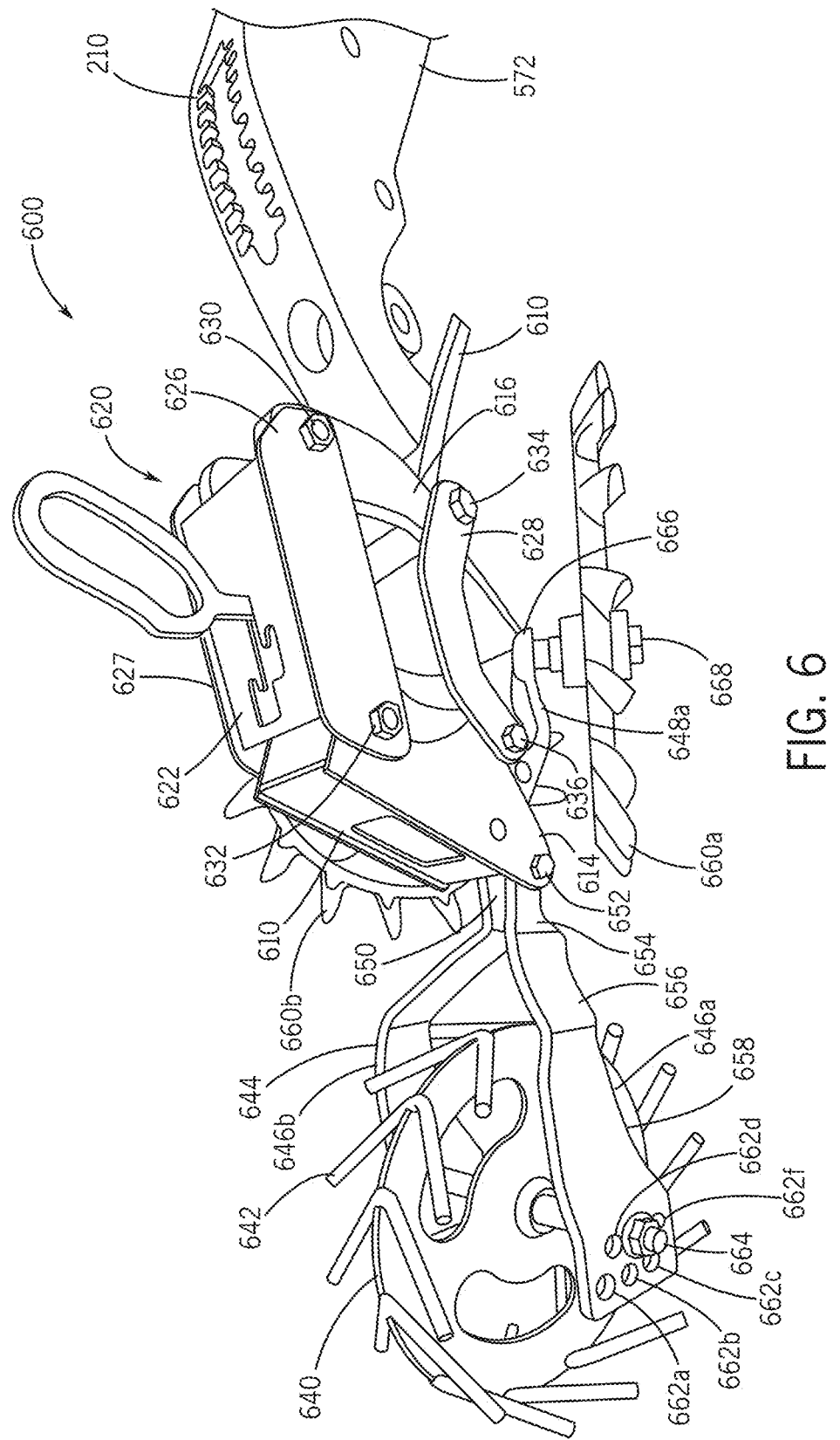
FIG. 6 illustrates a top, side perspective view of an embodiment of a furrow closer assembly with a walking beam connecting a press wheel to a pair of closing wheels and further connected to a four bar linkage.

New implementations of furrow closing assemblies 500, 600 are depicted in FIGS. 5A-6. In these implementations, the closing wheels 560*a/b*, 660*a/b* are attached to a final press wheel 540, 640 via a pivoting lever referred to herein as a walking beam 544, 644. A detailed discussion of the general nature and benefits of a walking beam assembly in a different application is presented in U.S. patent Ser. No. 10/060,467, which is hereby incorporated herein by reference.

As shown in FIG. 5A, a closing system 500 including a pair of closing wheels 560*a/b* and a trailing press wheel 540 are mounted to a walking beam 544, which is attached to a rear section of the opener frame 210 with a closing system coupler 516. In the embodiments depicted, the closing wheels 560*a/b* have a number of fingers or tines extending generally radially outward from each wheel hub. However, many other embodiments of closing wheels are available in the market for use in a closing system 500 depending upon application, soil type, weather conditions, etc., and the closing wheels depicted are exemplary and only for the purposes of general illustration. Similarly, the press wheel 540 is depicted a disk with a number of angled tines 542 spaced about a circumference of the disk to form a "chicken track" press wheel, for example, such as that shown and described in FIGS. 9-13F. However, many other embodiments of press wheels are available in the market for use in a closing system 500 (e.g., pneumatic rubber tires, solid rubber tires, plastic disks, etc.) depending upon application, soil type, weather conditions, etc., and the press wheel depicted is exemplary and only for the purposes of general illustration.

The design and configuration of the closing system coupler 516 may vary depending upon the manufacturer of the opening system, the design of the opener frame 210 of the opening system, and the attachment features provided therein. In the embodiment depicted, the rear end of the opener frame 210 provides for the attachment of a closing system coupler 516 using a pair of bolts connecting the closing system coupler 516 to lateral sidewalls of the opener frame 210. The closing system coupler 516 may be specifically designed to connect to the opener frame 210 with bolt holes in a pair of extending tabs configured to align with corresponding holes in the lateral sidewalls of the opener frame 210. As noted, may other configurations of a closing system coupler 516 are possible and contemplated.

Regardless, all embodiments of a closing system coupler 516 will include lateral pillow block extensions 514 for mounting the walking beam 544 to the closing system coupler 516. The pillow block extensions 514 may merely be formed as tabs of steel plate with apertures formed therein extending from the closing system coupler 516 parallel to and spaced apart from each other. The pillow block extensions 514 may further house journal bearings (not shown).

A hub 550 defining a cylindrical tube forms the center of the walking beam 544. As used herein "hub" generally includes any portion of the walking beam 544 at which the walking beam 544 is pivotally attached to a component of the trailing arm assembly or planter. For example, while the hub 550 is described as a cylindrical tube in the following example, this is for purposes of illustration only. In other examples, the hub 550 may be a different component, or feature, and/or a portion of the walking beam 544. The cylindrical tube of the hub 550 may or may not house one or more bearings, e.g., a pair of bearing races on either end or a race of longitudinal needle bearings within the tube. A pair of press wheel arms 546*a/b* extends as a fork from a first or rear side or wall of the hub 550. A pair of closing wheel arms 548*a/b* extends as a fork from a second or front side of the hub 550 substantially opposite from the attachment location of the press wheel arms 546*a/b*. The walking beam 544 may be formed of steel plate and tube components, cut to form, bent to shape, and welded together. Alternatively, the walking beam 544 may be formed as a single piece of cast steel. A hub shaft 552 may be received in the cylindrical tube of the hub 550 and further through the pillow block extensions 514 of the closing system coupler 516 to pivotably couple the walking beam 544 to the closing system coupler 516. As can be understood from FIGS. 5A-5C, the range of motion of the walking beam 544 about the hub 544 is limited on the side of the closing wheel arms 548*a/b*, which would ultimately bump upward against the opener frame 210. However, the range of motion of the walking beam 544 about the hub 250 on the side of the press wheel arms 546*a/b* is larger as the press wheel 540 can tip more vertically upward without interference with the closing system coupler 516 or the opener frame 210.

As depicted in FIGS. 5A-5C, each of the press wheel arms 546*a/b* is configured in three primary sections. A first section of each of the press wheel arms 546*a/b* is a bar portion 554 that is attached to one side of the hub 550 as noted above. Depending upon the construction, each bar portion 554 may be welded to the hub 550 or cast monolithically with the hub 550. A second section of each of the press wheel arms 546*a/b* is a splay portion 556 that extends from each bar portion 554 laterally outward at an angle at least a distance wide enough to extend beyond a width of the press wheel 540. A third section of each of the press wheel arms 546*a/b* is an axle stay portion 558 that extends rearward from the distal end of the splay portion 556, in a plane substantially parallel to a plane containing the corresponding bar portion 554 of the respective press wheel arm 546*a/b*, but laterally outward therefrom.

The axle stay portion 558 extends rearward a distance sufficient to extend beyond a position of a press wheel axle 564 for mounting the press wheel 540 in the space defined between the axle stay portions 558 of the press wheel arms 546*a/b*. Each of the axle stay portions 558 may define one or more axle adjustment apertures 562*a-f* within an area thereof. A press wheel axle 564 rotatably supporting the press wheel 540 is positioned within opposing and aligned ones of the axle adjustment apertures in each of the axle stay portions 558. As shown in the example of FIGS. 5A-5C, six axle adjustment apertures 562*a-f* are defined in each axle stay portion 558. (Note that aperture 562*e* is not marked as the press wheel axle 564 extends through that aperture and is therefore not visible.) As shown, the axle adjustment apertures 562*a-f* define a combination of 6 vertical height positions and two longitudinal positions for location of the press wheel axle 564. Any particular one of the axle adjustment apertures 562*a-f* may be selected for location of the press wheel axle 564 based upon one or more of the following factors: diameter of the press wheel 540 (for clearance of the splay portion 556 and bar portion 554), desired standard depth position of the closing wheels 560*a/b*

(which may also depend upon the diameter of the selected closing wheels 560*a/b*), force due to leverage of the walking beam 544 applied to the closing wheels 560*a/b*, upward travel distance of the closer wheel arms 549*a/b* with respect to the closing system coupler 516 of the opener frame 210, and other factors.

As noted, a pair of closing wheel arms 548*a/b* extend from the opposite side of the hub 550 of the walking beam 544 to the press wheel arms 546*a/b*. The closing wheel arms 548*a/b* may extend outward from the hub 550 in any of a number of configurations. For example, the closing wheel arms 548*a/b* may extend generally parallel to each other. Alternatively, the closing wheel arms 548*a/b* may splay laterally outward from each other as they extend away from the hub 550 in order to extend at a distal end laterally beyond the widths of the closing system coupler 516 and the opener frame 210. Additionally or alternatively, the closing wheel arms 548*a/b* may be attached to the hub 550 at an angle with respect to vertical or may twist along their lengths such that the distal ends of closer wheel arms 548*a/b* form an angle with respect to vertical. In some embodiments, the angle formed with respect to vertical is such that the closing wheels 560*a/b* are configured at angles with respect to vertical whereby the bottom edges of the closing wheels 560*a/b* are closer together than the top edges of the closing wheels 560*a/b*. In other words, the closing wheels 560*a/b* together form a V-shape. In addition to forming a V-shape, the closing wheels 560*a/b* together may be arranged such that a leading edge of the closing wheels 560*a/b* is further apart from one another along a horizontal direction as compared with a trailing edge of the closing wheels 560*a/ 560b*. In other examples, the closing wheels 560*a/b* together may be arranged such a leading edge of the closing wheels 560*a/b* is closer to one another along the horizontal direction as compared with a trailing edge of the closing wheels 560*a/560b*.

In some embodiments, a dog-leg 566 may extend at an angle from each of the closing wheel arms 548*a/b* proximal to the distal ends of the closing wheel arms 548*a/b*. As shown in FIGS. 5A-5C, the dog-legs 566 may extend upward from the closing wheel arms 548*a/b*. Closing wheel shafts 568 may be mounted to and extend from each of the dog-legs 566 for mounting the closing wheels 560*a/b* thereon. In some embodiments, rather than the closing wheel arms 548*a/b* twisting, the dog-legs 566 may be mounted to the closing wheel arms 548*a/b* at an angle with respect to vertical to provide the V-shaped orientation for the closing wheels 560*a/b*. The dog-legs 566 may be welded to the closing wheel arms 548*a/b* or they may be cast monolithically with the walking beam 544. Similarly, the closing wheel shafts 568 may be welded to the dog-legs 566 or they may be cast monolithically as part of the walking beam 544.

In any of the embodiments disclosed herein, the furrow closer assembly 600 may be connected to the opener frame 210 via a second parallel linkage 620 as depicted in the embodiment of FIG. 6. The furrow closer assembly 600 may thus operatively move independently with respect to the opener frame 210 and articulate vertically relative to the opener trailing arm assembly 200. The second parallel linkage 620 may include a closer mounting frame 610 at a rear end and a closer connecting bracket 616 fixedly attached (either permanently or removably) to the opener frame 210. On the embodiment shown, the closer connecting bracket 616 includes a tongue plate 618 for mounting (e.g., by bolting) the furrow closer assembly 600 to the opener frame 210.

The closer mounting frame 610 may be movably attached to the closer connecting bracket 616 via connecting bars of the second parallel linkage 620, preferably in a manner that provides stability to the sides of the second parallel linkage 620 to minimize twisting of the furrow closer assembly 600. The second parallel linkage 620 may have a first closer linking bar 626 and a second closer linking bar 628. The first closer linking bar 626 may be pivotably connected at a first end via a first closer pivot bearing 630 to the closer connecting bracket 616. The first closer linking bar 626 may be pivotably connected at a second end on a second closer pivot bearing 632 to the closer mounting frame 610. In this arrangement, the first closer linking bar 626 allows movement between the opener frame 210 and the closer mounting frame 610. The second closer linking bar 628 may be pivotably connected at a first end on a third closer pivot bearing 634 to the closer connecting bracket 616. The second closer linking bar 628 may be pivotably connected at a second end on a fourth closer pivot bearing 636 to the closer mounting frame 610.

The first closer linking bar 626 and the second closer linking bar 628 may be positioned in parallel relative to one another such that planes passing through the first and second closer pivot bearings 630, 632 and the third and fourth closer pivot bearings 634, 636, respectively, are parallel to one another. In this relationship, as the first closer linking bar 626 and the second closer linking bar 628 articulate through their range of motion, they remain parallel to one another. The parallel linkage 220 of the furrow opener assembly 200 provides a first degree of articulation for movement of the components positioned rearward of furrow opener assembly 200, e.g. the closing assembly 600. The second parallel linkage 620 of the closing assembly 600 provides a second degree of articulation that is independent of the opener assembly 200 and provides additional vertical range of movement for attachments to the furrow closer assembly 600, for example, closing wheels 660a, 660b.

In any embodiment, for example, as shown in FIG. 6, the second parallel linkage 620 may also include a third closer linking bar 627 and a fourth closer linking bar (not visible) that are spaced apart from the first closer linking bar 626 and the second closer linking bar 628, respectively, and are positioned as mirror opposites thereof. The third closer linking bar 627 and the fourth closer linking bar may be attached to the closer connecting bracket 616 at first ends and to the closer mounting frame 610 at second ends on pivot bearings located on the same axes as the pivot axes of the first, second, third, and fourth closer pivot bearings 630, 632, 634, 636, respectively. In any embodiment, the first and second closer pivot bearings 630, 632 may be shafts supported by the closer connecting bracket 616 to extend between and support both the first closer linking bar 626 and the third closer linking bar 627. Similarly, in any embodiment, the third and fourth closer pivot bearings 634, 636 may be shafts supported by the closer mounting frame 610 to extend between and support both the second closer linking bar 628 and the fourth closer linking bar.

In any contemplated implementation, the first closer linking bar 626 and the third closer linking bar 627 of the second parallel linkage 620 may be rigidly connected, for example, welded together with a cross-brace plate 622 to form a unitary structure. Similarly (although not presented in the figures), the second closer linking bar 628 and the fourth closer linking bar 629 may be rigidly connected, for example, welded together with a cross-brace to form a unitary structure. Such unitary formation may increase the lateral rigidity of the second parallel linkage 620. The unitary formation of either or both the upper and lower closer linking bars 626, 627, 628, 629 may be accomplished by means other than cross bracing. For example, each pair of linking bars may be cast, molded, machined, stamped, welded, or formed together by any other method as a single piece. In any embodiment, the closer mounting bracket 616 may be fixedly attached to (but generally removable from) the opener frame 210. The closer mounting bracket 616 may provide stability proximal to the sides of the second parallel linkage 620 such that twisting of the furrow closer assembly 600 is minimized. Further, the closer frame 610 may be formed as a rigid box structure that also provides external stability to the second parallel linkage 620 as the third and fourth closer pivot bearings 634, 636 are attached thereto.

As shown in FIG. 6, the closing system 600 includes a pair of closing wheels 660a/b and a trailing press wheel 640 attached to the closer mounting frame 610 of the second parallel linkage 620 by a walking beam 644. In the embodiments depicted, the closing wheels 660a/b have a number of fingers or tines extending generally radially outward from each wheel hub. However, many other embodiments of closing wheels are available in the market for use in a closing system 600 depending upon application, soil type, weather conditions, etc., and the closing wheels depicted are exemplary and only for the purposes of general illustration. Similarly, the press wheel 640 is depicted a disk with a number of angled tines 642 spaced about a circumference of the disk to form a "chicken track" press wheel, such as that shown and described in FIGS. 9-13F. However, many other embodiments of press wheels are available in the market for use in a closing system 600 (e.g., pneumatic rubber tires, solid rubber tires, plastic disks, etc.) depending upon application, soil type, weather conditions, etc., and the press wheel depicted is exemplary and only for the purposes of general illustration.

The design and configuration of the closer mounting frame 610 may vary depending upon the configuration of the attachment features provided thereon. In the embodiment depicted, the closer mounting frame 610 includes lateral pillow block extensions 614 for mounting the walking beam 644 to the second parallel linkage 620. The pillow block extensions 614 may merely be formed as tabs of steel plate with apertures formed therein extending from the second parallel linkage 620 parallel to and spaced apart from each other. The pillow block extensions 614 may further house journal bearings (not shown).

A hub 650 defining a cylindrical tube forms the center of the walking beam 644. As used herein "hub" generally includes any portion of the walking beam 644 at which the walking beam 644 is pivotally attached to a component of the trailing arm assembly or planter. For example, while the hub 650 is described as a cylindrical tube in the following example, this is for purposes of illustration only. In other examples, the hub 650 may be a different component, or feature, and/or a portion of the walking beam 644. The cylindrical tube of the hub 650 may or may not house one or more bearings, e.g., a pair of bearing races on either end or a race of longitudinal needle bearings within the tube. A pair of press wheel arms 646a/b extends as a fork from a first or rear side or wall of the hub 650. A pair of closer wheel arms 648a/b extends as a fork from a second or front side of the hub 650 substantially opposite from the attachment location of the press wheel arms 646a/b. The walking beam 644 may be formed of steel plate and tube components, cut to form, bent to shape, and welded together. Alternatively, the walking beam 644 may be formed as a single piece of cast steel. A hub shaft 652 may be received in the cylindrical tube of the hub 650 and further through the pillow block extensions 614 of the second parallel linkage 620 to pivotably couple the walking beam 644 to the second parallel linkage 620. As can be understood from FIG. 6, the range of motion of the walking beam 644 about the hub 644 is limited on the side of the closer wheel arms 648*a/b*, which would ultimately bump upward against the second parallel linkage 620. However, the range of motion of the walking beam 644 about the hub 250 on the side of the press wheel arms 646*a/b* is larger as the press wheel 640 can tip more vertically upward without interference with the closer mounting frame 610 of the second parallel linkage 620.

As depicted in FIG. 6, each of the press wheel arms 646*a/b* is configured in three primary sections. A first section of each of the press wheel arms 646*a/b* is a bar portion 654 that is attached to one side of the hub 650 as noted above. Depending upon the construction, each bar portion 654 may be welded to the hub 650 or cast monolithically with the hub 650. A second section of each of the press wheel arms 646*a/b* is a splay portion 656 that extends from each bar portion 654 laterally outward at an angle at least a distance wide enough to extend beyond a width of the press wheel 640. A third section of each of the press wheel arms 646*a/b* is an axle stay portion 658 that extends rearward from the distal end of the splay portion 656, in a plane substantially parallel to a plane containing the corresponding bar portion 654 of the respective press wheel arm 646*a/b*, but laterally outward therefrom.

The axle stay portion 658 extends rearward a distance sufficient to extend beyond a position of a press wheel axle 664 for mounting the press wheel 640 in the space defined between the axle stay portions 658 of the press wheel arms 646*a/b*. Each of the axle stay portions 658 may define one or more axle adjustment apertures 662*a-f* within an area thereof. A press wheel axle 664 rotatably supporting the press wheel 640 is positioned within opposing and aligned ones of the axle adjustment apertures in each of the axle stay portions 658. As shown in the example of FIG. 6, six axle adjustment apertures 662*a-f* are defined in each axle stay portion 658. (Note that aperture 662*e* is not marked as the press wheel axle 664 extends through that aperture and is therefore not visible.) As shown, the axle adjustment apertures 662*a-f* define a combination of six vertical height positions and two longitudinal positions for location of the press wheel axle 664. Any particular one of the axle adjustment apertures 662*a-f* may be selected for location of the press wheel axle 664 based upon one or more of the following factors: diameter of the press wheel 640 (for clearance of the splay portion 656 and bar portion 654), desired standard depth position of the closing wheels 660*a/b* (which may also depend upon the diameter of the selected closing wheels 660*a/b*), force due to leverage of the walking beam 644 applied to the closing wheels 660*a/b*, upward travel distance of the closer wheel arms 649*a/b* with respect to the second parallel linkage 620, and other factors.

As noted, a pair of closing wheel arms 648*a/b* extend from the opposite side of the hub 650 of the walking beam 644 to the press wheel arms 646*a/b*. The closing wheel arms 648*a/b* may extend outward from the hub 650 in any of a number of configurations. For example, the closing wheel arms 648*a/b* may extend generally parallel to each other. Alternatively, the closing wheel arms 648*a/b* may splay laterally outward from each other as they extend away from the hub 650 in order to extend at a distal end laterally beyond the width of the second parallel linkage 620. Additionally or alternatively, the closing wheel arms 648*a/b* may be attached to the hub 650 at an angle with respect to vertical or may twist along their lengths such that the distal ends of closer wheel arms 648*a/b* form an angle with respect to vertical. In some embodiments, the angle formed with respect to vertical is such that the closing wheels 660*a/b* are configured at angles with respect to vertical whereby the bottom edges of the closing wheels 660*a/b* are closer together than the top edges of the closing wheels 660*a/b*. In other words, the closing wheels 660*a/b* together form a V-shape. In addition to forming a V-shape, the closing wheels 660*a/b* together may be arranged such that a leading edge of the closing wheels 660*a/b* is further apart from one another along a horizontal direction as compared with a trailing edge of the closing wheels 660*a*/660*b*. In other examples, the closing wheels 660*a/b* together may be arranged such a leading edge of the closing wheels 660*a/b* is closer to one another along the horizontal direction as compared with a trailing edge of the closing wheels 660*a*/660*b*.

In some embodiments, a dog-leg 666 may extend at an angle from each of the closing wheel arms 648*a/b* proximal to the distal ends of the closing wheel arms 648*a/b*. As shown in FIG. 6, the dog-legs 666 may extend upward from the closing wheel arms 648*a/b*. Closing wheel shafts 668 may be mounted to and extend from each of the dog-legs 666 for mounting the closing wheels 660*a/b* thereon. In some embodiments, rather than the closing wheel arms 648*a/b* twisting, the dog-legs 666 may be mounted to the closing wheel arms 648*a/b* at an angle with respect to vertical to provide the V-shaped orientation for the closing wheels 660*a/b*. The dog-legs 666 may be welded to the closing wheel arms 648*a/b* or they may be cast monolithically with the walking beam 644. Similarly, the closing wheel shafts 668 may be welded to the dog-legs 666 or they may be cast monolithically as part of the walking beam 644.

The closing systems 500, 600 with walking beams 544, 644 allow the closing wheels 560*a/b*, 660*a/b* and the connected press wheel 540, 640 to follow the contours of the field, undulating or see-sawing as the closing wheels 560*a/b*, 660*a/b* and the press wheel 540, 640 negotiate over or through obstructions on the surface of a field surface without lifting the furrow opener assembly 200, which could adversely impacting seed deposit depth (e.g., the planting depth is too deep for plant emersion) or result in damage to the planter components. In the embodiment of FIG. 6, the closing system 600 further reduces possible impact of vertical movement of the closing system 600 on the furrow opener assembly 200 through the added use of the second parallel linkage, which provides additional independent vertical movement for the entire closing system 600. Because the closing wheels 560*a/b*, 660*a/b* are pivotably coupled to the press wheel 540, 640 by the walking beam 544, 644, when the press wheel 540, 640 encounters an obstacle, the walking beam 544, 644 forces the closing wheels 560*a/b*, 660*a/b* downward into the soil. Without the walking beam 544, 644, a press wheel rigidly mounted to the closing system would lift the entire closing system when rolling over an obstacle, thus lifting the closing wheels above the soil and preventing closure of soil over the seed (or fertilizer, or both).

The walking beam 544, 644 also allows the closing wheels 560*a/b*, 660*a/b* and the press wheel 540, 640 to maintain a more consistent and balanced downward pressure as between the closing wheels 560*a/b*, 660*a/b* and the press wheel 540, 640. Excessive pressure on the closing wheels 560*a/b*, 660*a/b* may result in excessive soil covering the seed and thereby inhibit plant growth. Excessive pressure on the press wheel 540, 640 may result in excessive soil compaction over the seed and, again, inhibit plant growth.

The walking beam 544, 644 helps distribute the downward force load between the closing wheels 560*a/b*, 660*a/b* and the press wheel 540, 640.

In the alternate embodiment shown in FIGS. 7A-7D, instead of a closing system, a fertilizer system 700 may be configured with a walking beam 744 attached to a pair of fertilizer opener discs 760*a/b* at a forward end and a press wheel 740 at a rear end for use with a fertilizer distribution system. As with the closing system 600 described above, the walking beam 744 is shown attached to the fertilizer system mounting frame 710 of the second parallel linkage 720. However, the walking beam 744 could be directly attached to the opener frame 210 as described with respect to the closing system 500. In the embodiments depicted, the fertilizer opener discs 760*a/b* are thin blades with a teeth extending generally radially outward from each disc hub and are designed to cut a narrow slit in the soil for injection of liquid fertilizer. However, many other embodiments of fertilizer opener discs are available in the market for use in a fertilizer system 700 depending upon application, soil type, weather conditions, etc., and the fertilizer opener discs depicted are exemplary and only for the purposes of general illustration. Similarly, the press wheel 740 is depicted a disk with a number of angled tines 742 spaced about a circumference of the disk to form a "chicken track" press wheel, for example, as shown and described in FIGS. 9-13F. However, many other embodiments of press wheels are available in the market for use in a fertilizer system 700 (e.g., pneumatic rubber tires, solid rubber tires, plastic disks, etc.) depending upon application, soil type, weather conditions, etc., and the press wheel depicted is exemplary and only for the purposes of general illustration. In the fertilizer system 700, the press wheel 740 is provided trailing the fertilizer opener discs 760*a/b* and the fertilizer injection units to close the slits once the fertilizer is injected.

The design and configuration of the fertilizer system mounting frame 710 may vary depending upon the configuration of the attachment features provided thereon. In the embodiment depicted, the fertilizer system mounting frame 710 includes lateral pillow block extensions 714 for mounting the walking beam 744 to the second parallel linkage 720. The pillow block extensions 714 may merely be formed as tabs of steel plate with apertures formed therein extending from the second parallel linkage 720 parallel to and spaced apart from each other. The pillow block extensions 714 may further house journal bearings (not shown).

A hub 750 defining a cylindrical tube forms the center of the walking beam 744. As used herein "hub" generally includes any portion of the walking beam 744 at which the walking beam 744 is pivotally attached to a component of the trailing arm assembly or planter. For example, while the hub 750 is described as a cylindrical tube in the following example, this is for purposes of illustration only. In other examples, the hub 750 may be a different component, or feature, and/or a portion of the walking beam 744. The cylindrical tube of the hub 750 may or may not house one or more bearings, e.g., a pair of bearing races on either end or a race of longitudinal needle bearings within the tube. A pair of press wheel arms 746*a/b* extends as a fork from a first or rear side or wall of the hub 750. A pair of fertilizer wheel arms 748*a/b* extends as a fork from a second or front side of the hub 750 substantially opposite from the attachment location of the press wheel arms 746*a/b*. The walking beam 744 may be formed of steel plate and tube components, cut to form, bent to shape, and welded together. Alternatively, the walking beam 744 may be formed as a single piece of cast steel. A reinforcing yoke 751 may be provided between the press wheel arms 744 adjacent to the hub 750 in order to provide additional strength to the press wheel arms 744 and their connection with the hub 750. A second yoke or reinforcing web 753 may be provided between the fertilizer wheel arms 744 adjacent to the hub 750 in order to provide additional strength to the fertilizer wheel arms 744 and their connection with the hub 750

A hub shaft 752 may be received in the cylindrical tube of the hub 750 and further through the pillow block extensions 714 of the second parallel linkage 720 to pivotably couple the walking beam 744 to the second parallel linkage 720. As can be understood from FIG. 7A, the range of motion of the walking beam 744 about the hub 744 is limited on the side of the closer wheel arms 748*a/b*, which would ultimately bump upward against the second parallel linkage 720. However, the range of motion of the walking beam 744 about the hub 250 on the side of the press wheel arms 746*a/b* is larger as the press wheel 740 can tip more vertically upward without interference with the closer mounting frame 710 of the second parallel linkage 720.

As depicted in FIGS. 7A-7D, each of the press wheel arms 746*a/b* is configured in three primary sections. A first section of each of the press wheel arms 746*a/b* is a bar portion 754 that is attached to one side of the hub 750 as noted above. Depending upon the construction, each bar portion 754 may be welded to the hub 750 or cast monolithically with the hub 750. A second section of each of the press wheel arms 746*a/b* is a splay portion 756 that extends from each bar portion 754 laterally outward at an angle at least a distance wide enough to extend beyond a width of the press wheel 740. A third section of each of the press wheel arms 746*a/b* is an axle stay portion 758 that extends rearward from the distal end of the splay portion 756, in a plane substantially parallel to a plane containing the corresponding bar portion 754 of the respective press wheel arm 746*a/b*, but laterally outward therefrom.

Figure 7A:
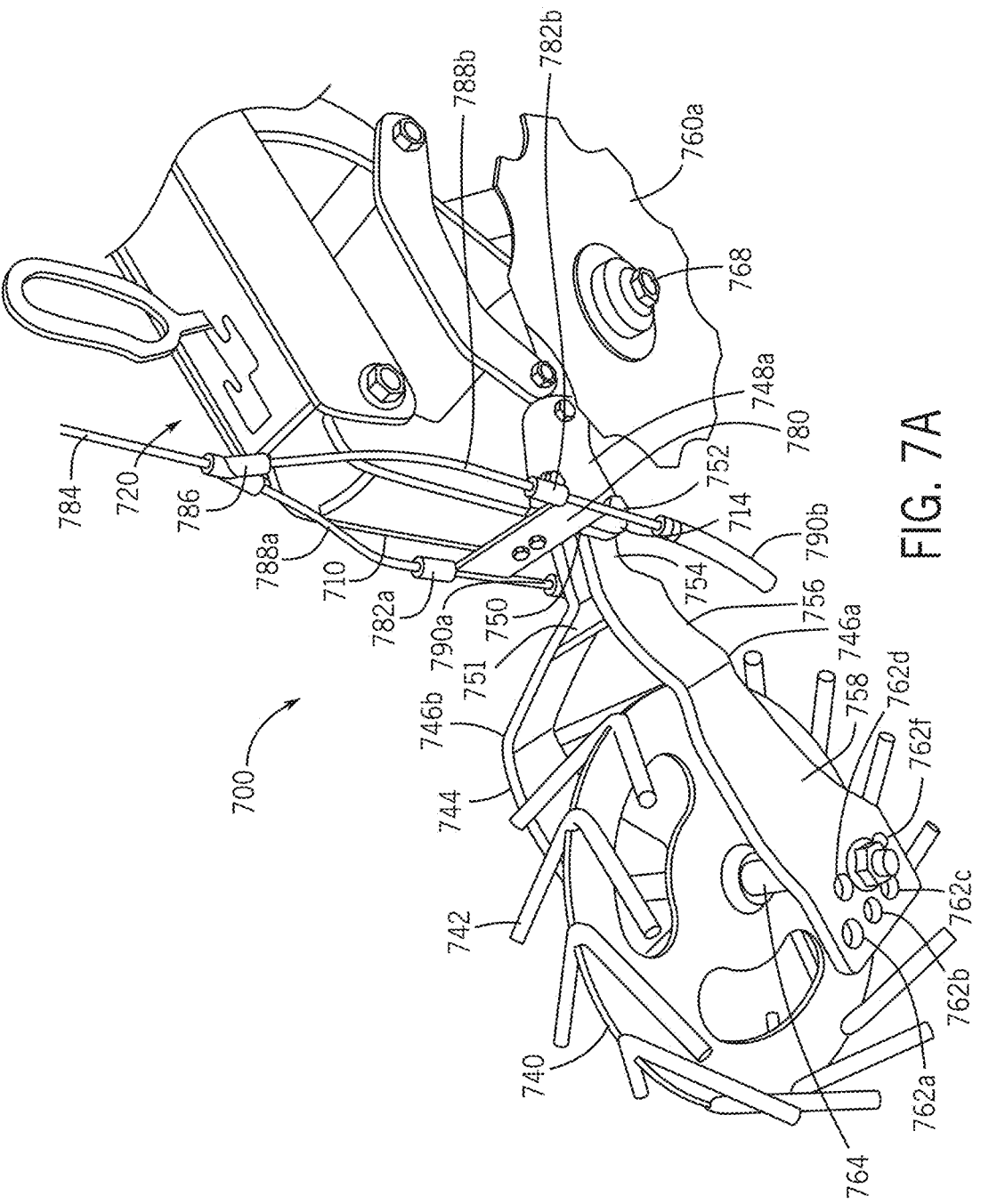
FIG. 7A illustrates a top, side, perspective view of an embodiment of a trailing assembly including a fertilizer assembly with a walking beam connecting a press wheel to a pair of closing wheels and further connected to a four bar linkage.

The axle stay portion 758 extends rearward a distance sufficient to extend beyond a position of a press wheel axle 764 for mounting the press wheel 740 in the space defined between the axle stay portions 758 of the press wheel arms 746*a/b*. Each of the axle stay portions 758 may define one or more axle adjustment apertures 762*a-f* within an area thereof. A press wheel axle 764 rotatably supporting the press wheel 740 is positioned within opposing and aligned ones of the axle adjustment apertures in each of the axle stay portions 758. As shown in the example of FIG. 7A, six axle adjustment apertures 762*a-f* are defined in each axle stay portion 758. (Note that aperture 762*b* is not marked as the press wheel axle 764 extends through that aperture and is therefore not visible.) As shown, the axle adjustment apertures 762*a-f* define a combination of six vertical height positions and two longitudinal positions for location of the press wheel axle 764. Any particular one of the axle adjustment apertures 762*a-f* may be selected for location of the press wheel axle 764 based upon one or more of the following factors: diameter of the press wheel 740 (for clearance of the splay portion 756 and bar portion 754), desired standard depth position of the fertilizer opener discs 760*a/b* (which may also depend upon the diameter of the selected fertilizer opener discs 760*a/b*), force due to leverage of the walking beam 744 applied to the fertilizer opener discs 760*a/b*, upward travel distance of the closer wheel arms 749*a/b* with respect to the second parallel linkage 720, and other factors.

As noted, a pair of fertilizer opener disc arms 748*a/b* extend from the opposite side of the hub 750 of the walking beam 744 to the press wheel arms 746*a/b*. The fertilizer opener disc arms 748*a/b* may extend outward from the hub 750 in any of a number of configurations. For example, the fertilizer opener disc arms 748*a/b* may extend generally parallel to each other. Alternatively, the fertilizer opener disc arms 748*a/b* may splay laterally outward from each other as they extend away from the hub 750 in order to extend at a distal end laterally beyond the width of the second parallel linkage 720. Additionally or alternatively, the fertilizer opener disc arms 748*a/b* may be attached to the hub 750 at an angle with respect to vertical or may twist along their lengths such that the distal ends of closer wheel arms 748*a/b* form an angle with respect to vertical. In some embodiments, the angle formed with respect to vertical is such that the fertilizer opener discs 760*a/b* are configured at angles with respect to vertical whereby the bottom edges of the fertilizer opener discs 760*a/b* are closer together than the top edges of the fertilizer opener discs 760*a/b*. In other words, the fertilizer opener discs 760*a/b* together form a V-shape. In addition to forming a V-shape, the closing wheels 760*a/b* together may be arranged such that a leading edge of the closing wheels 760*a/b* is further apart from one another along a horizontal direction as compared with a trailing edge of the closing wheels 760*a*/760*b*. In other examples, the closing wheels 760*a/b* together may be arranged such a leading edge of the closing wheels 760*a/b* is closer to one another along the horizontal direction as compared with a trailing edge of the closing wheels 760*a*/760*b*.

Figure 7B:
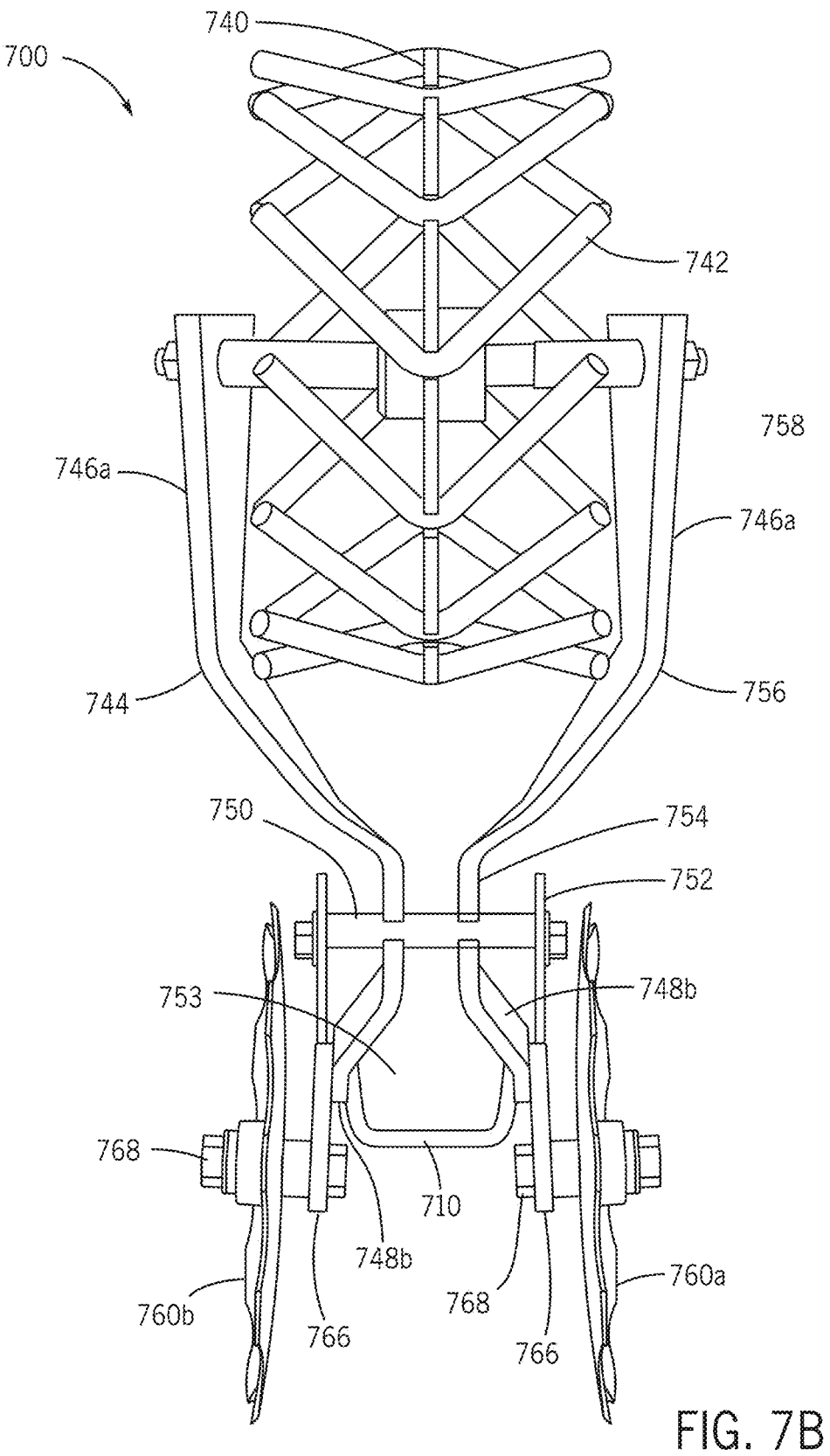
FIG. 7B illustrates a bottom, rear, perspective view of the trailing assembly of FIG. 7A.

In some embodiments, a dog-leg 766 may extend at an angle from each of the fertilizer opener disc arms 748*a/b* proximal to the distal ends of the fertilizer opener disc arms 748*a/b*. As shown in FIGS. 7B and 7D, the dog-legs 766 may extend downward from the fertilizer opener disc arms 748*a/b*. The downward extension in the embodiment of the fertilizer system 700 is reflective of a desire for the fertilizer opener discs 760*a/b* to cut into the soil as opposed to closing wheels which are designed to push soil mounded above the edges of furrow into the furrow to cover the seed. Fertilizer opener disc shafts 768 may be mounted to and extend from each of the dog-legs 766 for mounting the fertilizer opener discs 760*a/b* thereon. In some embodiments, rather than the fertilizer opener disc arms 748*a/b* twisting, the dog-legs 766 may be mounted to the fertilizer opener disc arms 748*a/b* at an angle with respect to vertical to provide the V-shaped orientation for the fertilizer opener discs 760*a/b*. The dog-legs 766 may be welded to the fertilizer opener disc arms 748*a/b* or they may be cast monolithically with the walking beam 744. Similarly, the fertilizer opener disc shafts 768 may be welded to the dog-legs 766 or they may be cast monolithically as part of the walking beam 744.

The fertilizer system 700 with the walking beam 744 allows the fertilizer opener discs 760*a/b* and the connected press wheel 740 to follow the contours of the field, undulating or see-sawing as the fertilizer opener discs 760*a/b* and the press wheel 740 negotiate over or through obstructions on the surface of a field surface without lifting the furrow opener assembly 200, which could adversely impacting seed deposit depth (e.g., the planting depth is too deep for plant emersion) or result in damage to the planter components. In the embodiment of FIG. 7, the fertilizer system 700 further reduces possible impact of vertical movement of the fertilizer system 700 on the furrow opener assembly 200 through the added use of the second parallel linkage, which provides additional independent vertical movement for the entire fertilizer system 700. Because the fertilizer opener discs 760*a/b* are pivotably coupled to the press wheel 740 by the walking beam 744, when the press wheel 740 encounters an obstacle, the walking beam 744 forces the fertilizer opener discs 760*a/b* downward into the soil. Without the walking beam 744, a press wheel rigidly mounted to the fertilizer system would lift the entire fertilizer system when rolling over an obstacle, thus lifting the fertilizer opener discs above the soil and preventing them from opening a slit in the soil. Without the slit, fertilizer will be sprayed on the surface of the soil rather than in the root zone below the soil and the plants in that section will not receive appropriate nutrients and yield suffers.

The walking beam 744 also allows the fertilizer opener discs 760*a/b* and the press wheel 740 to maintain a more consistent and balanced downward pressure as between the fertilizer opener discs 760*a/b* and the press wheel 740. Excessive pressure on the fertilizer opener discs 760*a/b* may result depositing fertilizer too deeply and thereby inhibiting plant growth. Excessive pressure on the press wheel 740 may result in excessive soil compaction over the seed and, again, inhibit plant growth. The walking beam 744 helps distribute the downward force load between the fertilizer opener discs 760*a/b* and the press wheel 740.

Figure 7C:
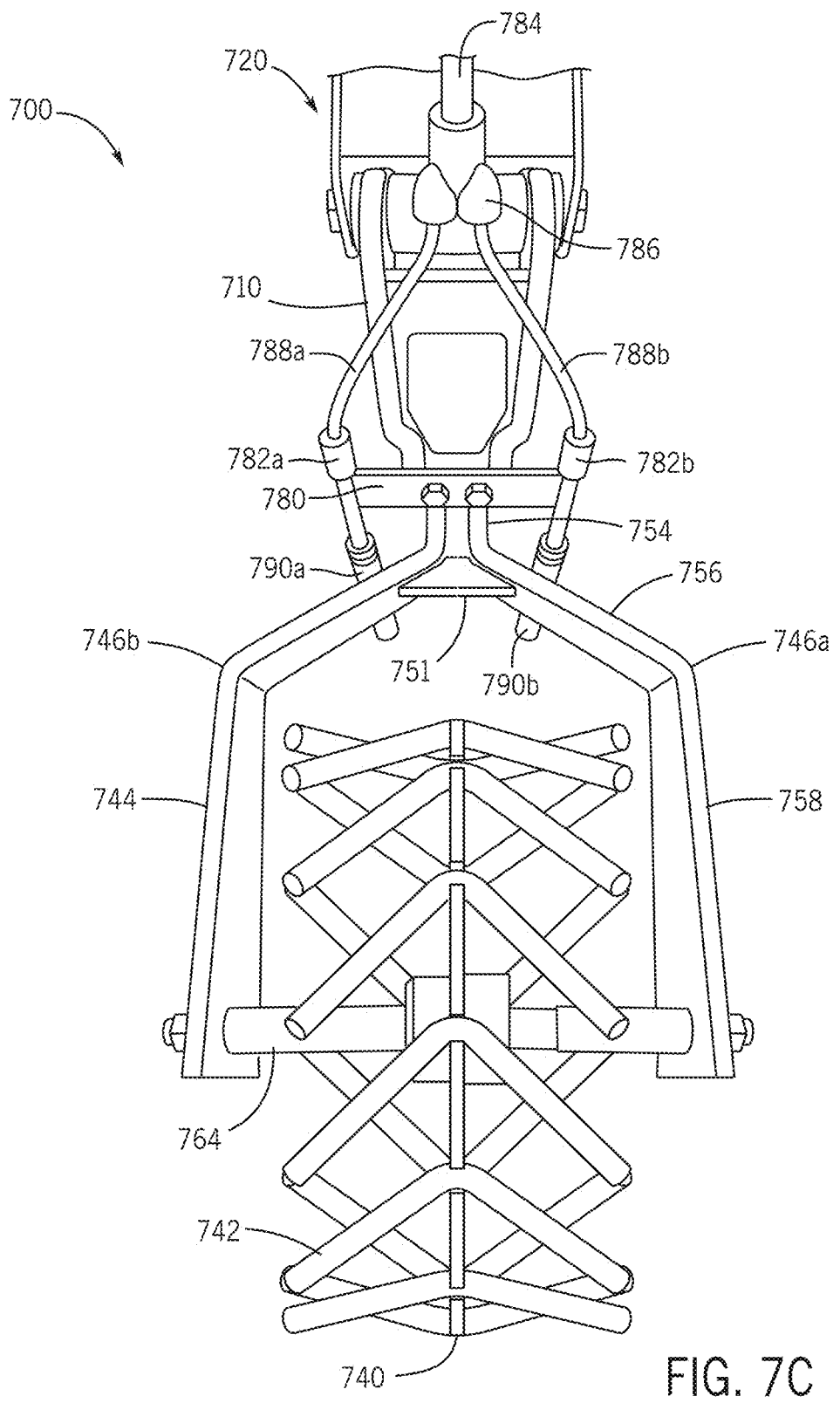
FIG. 7C illustrates a top perspective view of the trailing assembly of FIG. 7A.
Figure 7D:
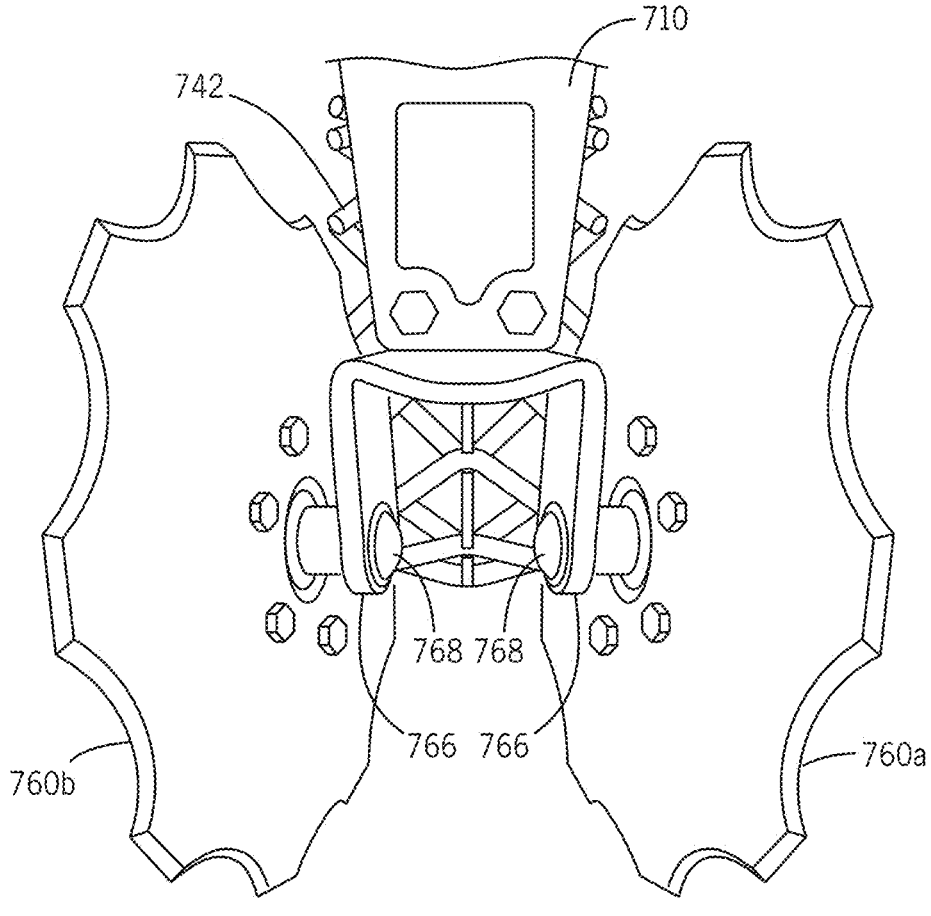
FIG. 7D illustrates a rear perspective view of the trailing assembly of FIG. 7A.

With continued reference to FIGS. 7A-7D, various fertilizer injection components are shown. Generally, the fertilizer injection components may be mounted behind each of the fertilizer opener discs 760*a/b* in order to stream fertilizer into the slit created by said discs. In operation, the press wheel 740 subsequently engages the soil of the slit, and mellows the soil with the fertilizer in the ground. In the example of FIGS. 7A and 7C, a fertilizer mounting bracket 780 is shown. The fertilizer mounting bracket 780 may define a mount for tubing of the fertilizer system. For example, the fertilizer mounting bracket 780 may be fixed to the fertilizer system mounting frame 710 and extend generally laterally therefrom. The fertilizer mounting bracket 780 may include at least a first tubing guide 782*a* connected to a first side of the fertilizer mounting bracket 780, and a second tubing guide 782*b* connected to a second side of the fertilizer mounting bracket 780.

The fertilizer system 700 may use tubing in order to deliver liquid fertilizer to the slit created by the fertilizer opener discs 760*a*/760*b*. In the example of FIGS. 7A and 7C, a tubing main line 784 is shown. The tubing main line 784 may receive liquid fertilizer from a central drum or other system of the planter. A split-T 786 may be connected to the tubing main line 784 and used to divert flow of the liquid fertilizer to a first branch tubing 788*a* and a second branch tubing 788*b*. The first branch tubing 788*a* may extend from the split-T 786 and be engaged with the first tubing guide 782*a*. Further, the second branch tubing 788*b* may extend from the split-T 786 and be engaged with the second tubing guide 782*b*. In some cases, the first branch tubing 788*a* may be positionally restrained by the first tubing guide 782*a* such that the branch tubing 788*a* extends toward a slit formed by the fertilizer opener disc 760*b*. Further, the second branch tubing 788*b* may be positionally restrained by the second tubing guide 782*b* such that the branch tubing 788*b* extends toward a slit formed by the fertilizer opener disc 760*a*. Further, FIGS. 7A and 7C show a first fertilizer delivery end piece 790*a* and a second fertilizer delivery end piece 790*b*. The first fertilizer delivery end piece 790*a* may be a generally deformable structure that is configured to emit the liquid fertilizer into the slit created by the fertilizer opener disc 760*b*. The second fertilizer delivery end piece 790*b* may be a generally deformable structure that is configured to emit the liquid fertilizer into the slit created by the fertilizer opener disc 760*a*. It will be appreciated that the various fertilizer injection components shown and described in FIGS. 7A and 7C are for purposes of illustration. In other examples, other fertilizer injection components may be used.

Figure 8:
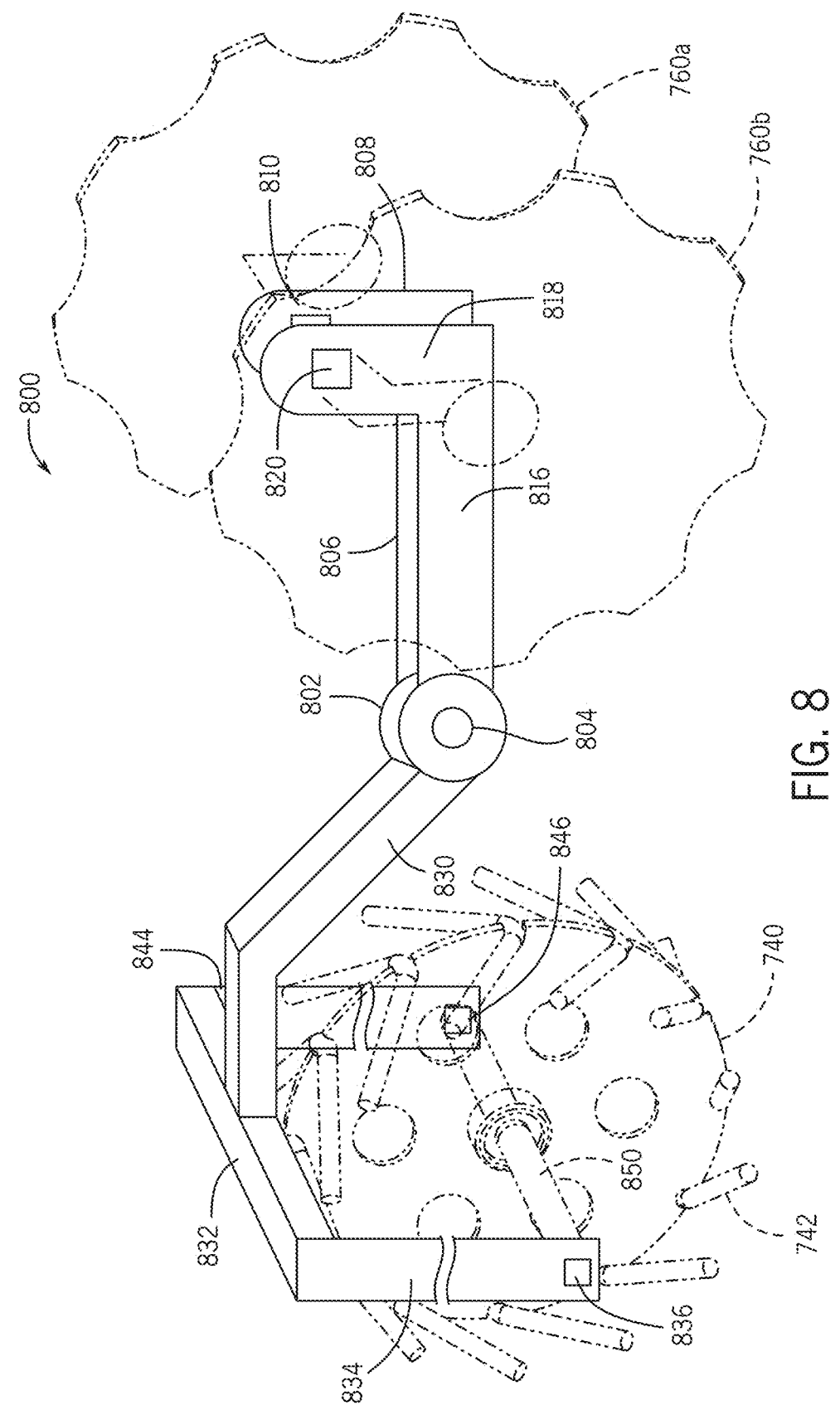
FIG. 8 illustrates another example of a walking beam for use with a trailing assembly.

With reference to FIG. 8, a walking beam 800 is shown. The walking beam 800 may be used with any of the trailing assemblies, closing assemblies, and fertilizer assemblies shown and described herein, such as those of FIGS. 5A-7D. In the example of FIG. 8, the walking beam 800 include a hub 802. The hub 802 may generally be arranged along an intermediate portion of the walking beam 800 and define a pivot 804. The pivot 804 may be configured for rotatable coupling with a mount of the planter, including a mount of a four-link closer. The walking beam 800 further includes a first arm 806 and a second arm 816. The first arm 806 and the second arm 816 may extend from a first side or first portion of the hub 802. The first arm 806 and the second arm 816 may cooperate to each define a mount for rotatable coupling with a rotatable implement of the planter, such as a closing disc and/or fertilizer disc. The first arm 806 and the second arm 816 may further cooperate to position or define an orientation of the respective discs relative to one another, such as by defining a V-type shape of the first and second rotatable implements.

For example, the first arm 806 and the second arm 816 may extend from the hub 802 and each define respective arm attachments. In FIG. 8, the first arm 806 is shown connected to a first attachment end 808 and the second arm 816 is shown connected to a second attachment end 818. The first attachment end 808 and the second attachment end 818 may extend generally perpendicularly from, and at an angle relative to, the respective first arm 806 and the second arm 816. The first attachment end 808 may include the physical terminal end of the first arm 806. The first attachment end 808 may be a free end or an end that is connected or adjacent to another structure. Further, the second attachment end 818 may include the physical terminal end of the second arm 816. The second attachment end 818 may be a free end or an end that is connected or adjacent to another structure. The first attachment end 808 may define a first attachment pivot 810 that is configured for rotatably coupling a first rotatable implement to the first arm 806, such as the example first fertilizer disc 760a shown in FIG. 8. In other cases, a closing disc and/or other rotatable implement may be rotatably coupled to the first attachment pivot 810. The second attachment end 818 may define a second attachment pivot 820 that is configured for rotatably coupling a second rotatable implement to the second arm 816, such as example second fertilizer disc 760b shown in FIG. 8. In other cases, a closing disc and/or other rotatable implement may be rotatably coupled to the second attachment pivot 820. In some cases, the first attachment end 808 and the second attachment end 818 may be arranged at an angle relative to the first arm 806 and the second arm 816 in order to define the orientation of the rotatable implements relative to one another, such as in a V-shaped configuration.

The walking beam 800 of FIG. 8 may also include a third arm 830. The third arm 830 may extend from the hub 802 from a second, generally opposing side relative to the first arm 806 and the second arm 816. In the example of FIG. 8, the third arm 830 may extend from the hub 802 to a crossbeam 832 and define an elbow, bend, or angled portion therebetween. This configuration may permit the crossbeam 832 to be raised above, or otherwise offset from, an axis of the hub 802. For example, the crossbeam 832 may extend generally parallel with and raised above the axis of the hub 804. The crossbeam 832 may be used to facilitate the rotatable coupling of a press wheel or other rotatable implement to the walking beam 800, such as the example press wheel 740. For example, on a first end of the crossbeam 832, a crossbeam first attachment end 834 may extend downward and define a first pivot 836. Further, on a second end if the crossbeam 832, a crossbeam second attachment end 844 may extend downward and define a second pivot 846. An axle 850 (shown in dashed line) of the press wheel 740 may extend between the first pivot 836 and the second pivot 846 for rotatable coupling with the respective crossbeam first attachment end 834 and the crossbeam second attachment end 836. In other cases, other press wheel may be coupled with the walking beam, such as any of the press wheel described herein.

The walking beam 800 may permit relative pivoting displacement of the various rotatable implements coupled therewith. For example, a displacement of a first or second implement (e.g., a closing disc or a fertilizer disc) that is rotatably coupled with a respective one of the first arm 806 or the second arm 816, may cause a corresponding displacement of a press wheel or other rotatable implement that is rotatable coupled to the third arm 830. This may allow the rotatable implements to traverse uneven terrain and provide adequate coverage and contact with the soil. For example, a soil deviation may cause the first/second rotatable implements to pivot in a first direction, which may in turn cause the third rotatable implement to pivot in a second, opposing direction.

Figure 9:
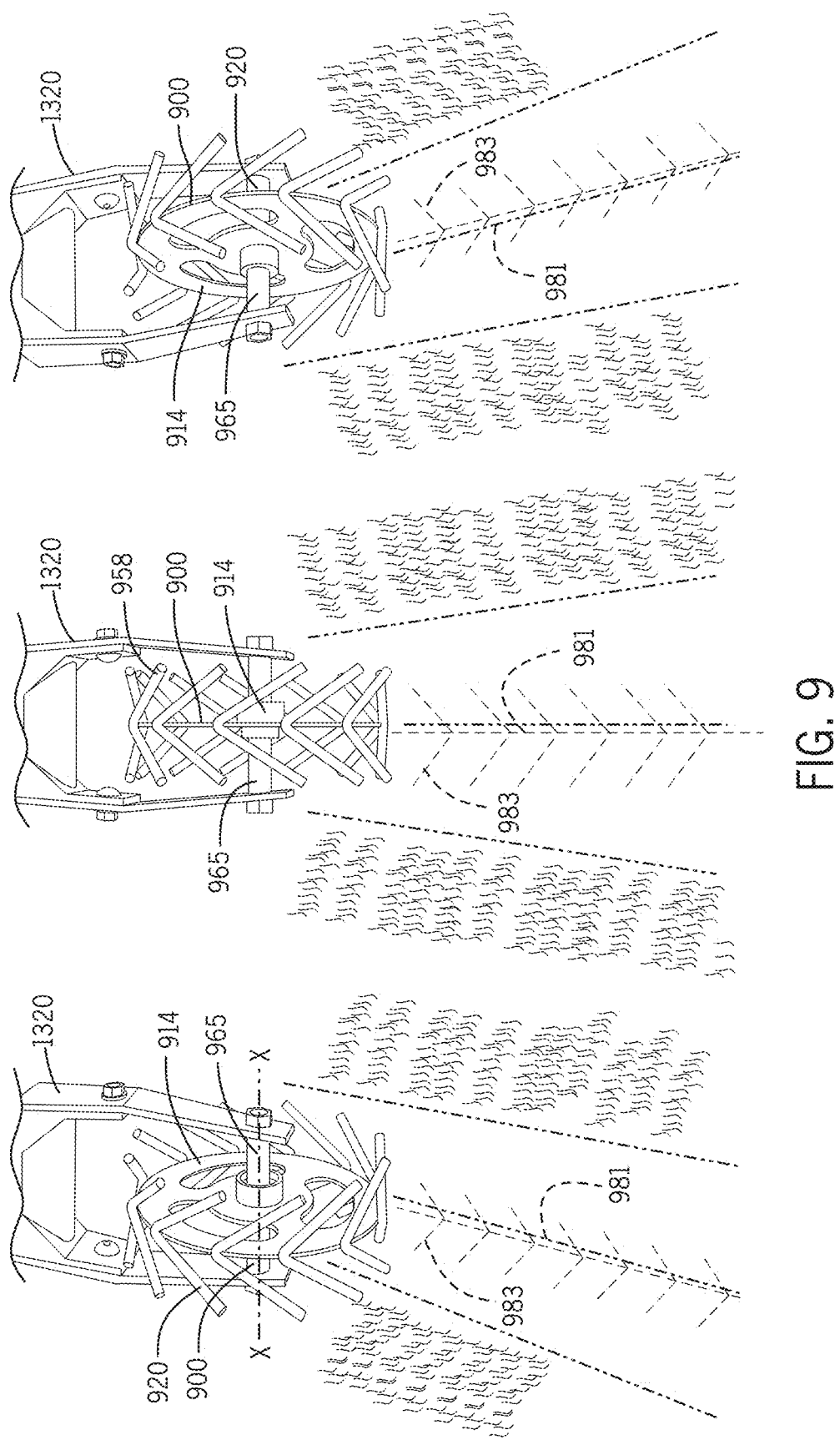
FIG. 9 illustrates a rear view of the agricultural planter showing the press wheel in accordance with an embodiment of the present invention.
Figures 10A, 10B:
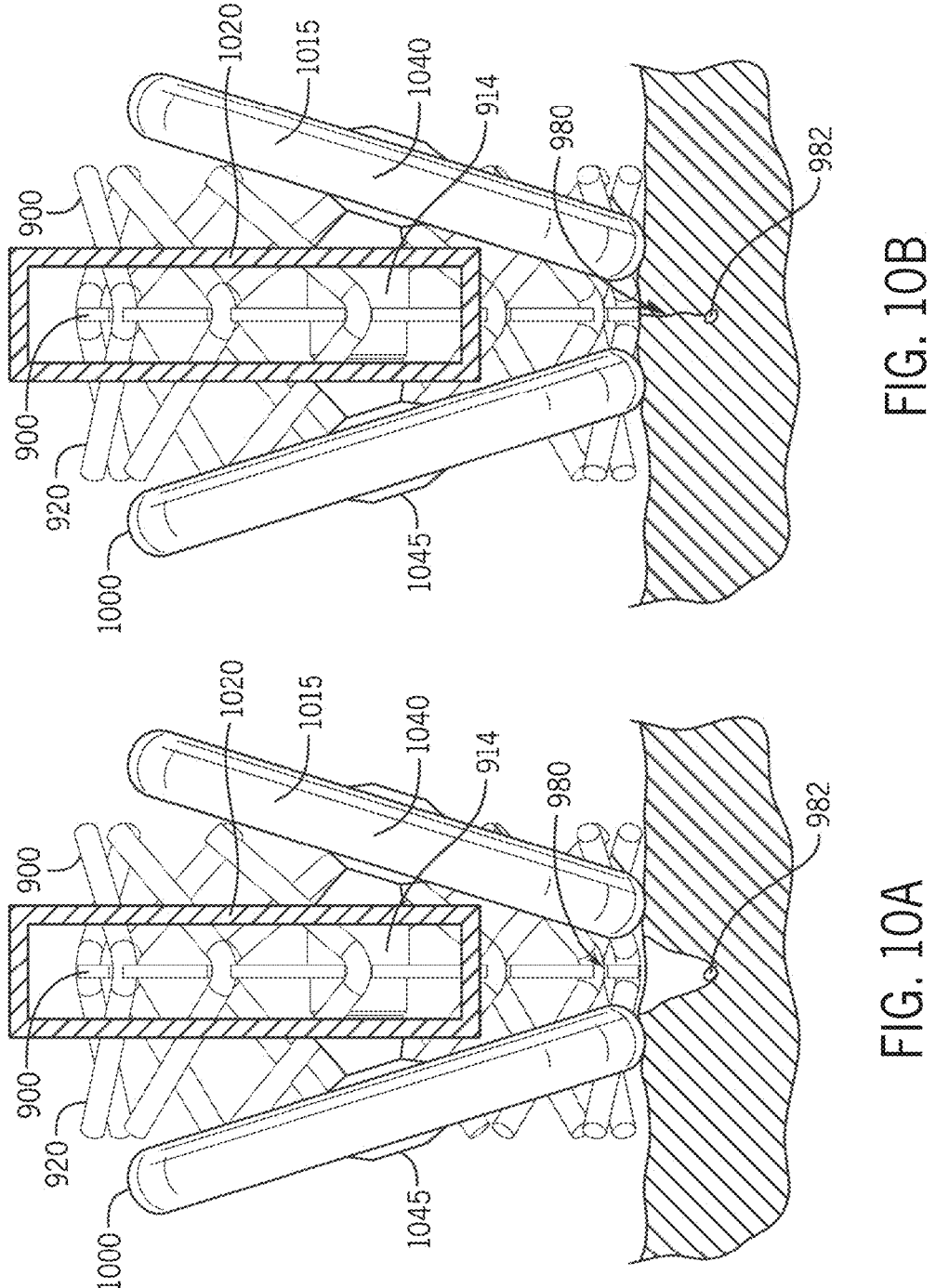
FIG. 10A illustrates a sectional view of the agricultural planter looking rearward, showing an open furrow in accordance with an embodiment of the present invention.
FIG. 10B illustrates a sectional view of the agricultural planter looking rearward, showing a closed furrow in accordance with an embodiment of the present invention.

In some examples, as illustrated in FIGS. 9, 10A, and 10B, a press wheel 900 may follow closing wheels 1000, 1015 and condition the closed furrow seam 981. The press wheel 900 and closing wheels 1000, 1015 may be used with any of the furrow closing assemblies, fertilizer assemblies, and trailing assemblies described herein, such as the furrow closing assemblies 500, 600, and 700, described above. As shown in FIGS. 9-10B, the press wheel 900 applies a downward pressure on the closed furrow 981. The pressure against the soil may come from tread portions 920 and/or a rim. The pressure may be applied without applying pressure from webbing or other material linking the tread portions 920 at any point other than that proximal to a center plane. In one example, the tread portions 920 may extend from each side of a center plane, which as shown in FIG. 9 may be a rim.

In accordance with various embodiments, the press wheel 900 may be approximately centered on the closed furrow seam 981. This position may be independent of the location of either the opening wheels 960 or the closing wheels 1000, 1015. But, the closing wheels 1000, 1015 may be positioned on the sides of the open furrow 980 in order to close the furrow. As such, additionally or alternatively the press wheel 900 may be centered between the closing wheels. However, in embodiments with a single closing wheel or offset closing wheels, the press wheel 900 may be positioned on the side of the closing wheel which directs soil into the open furrow. In accordance with various embodiments, the press wheel 900 may be positioned relative to the opening wheel (or opening wheels) 960 regardless of the presence or position of closing wheels. In such an embodiment, the press wheel 900 may follow the opening wheel 960. The press wheel 900 may be positioned so that the press wheel 900 is centered in line with or approximately in line with the location at which the opening wheel 960 engages or is designed to engage the soil. In other embodiments, the press wheel 900 may be offset from the location of engagement between either the opening disk and the soil or the closing disk and the sides of the furrow 980. For example, the press wheel 900 may be aligned such that one set of tines 920 may extend from one side of the press wheel 900 and may engage or press on the closed furrow seam 981.

As the press wheel 900 creates a downward pressure, the press wheel 900 and the tread portions 920 may imprint a tread pattern 983 on the ground. The tread pattern 983 may resemble a chicken track. The imprint pattern may be formed because the volume between tread portions 920 may not contact the soil, limiting contact to either or both of the rim and the tread portion 920. In one example, two lines may extend from, and at an angle to, a line passing at or close to the closed furrow seam 981. The two lines may be angled in the same direction. The lines may be symmetric, having a common point meeting proximal to the center plane and pointing away from the direction of travel of the tractor. In another example, the lines may be non-symmetric but still have a common point meeting proximal to the center plane and pointing away from the direction of travel of the tractor. In another example, the lines may be staggered, not having a common point proximal to the center plane but still angled such that the imprint points away from the direction of travel of the tractor.

Now referring to FIG. 10A which depicts a sectional view of the agriculture planter looking rearward and showing an open furrow 980. A trailing arm frame 1020 is shown attached to the furrow closer wheels 1000/1015 (various embodiments may utilize a single closing wheel). The trailing arm frame 1020 may include pivots 1040/1045 that may extend through the closing wheels 1015/1000. These closing wheels 1000/1015 may be aligned or staggered. These closing wheels 1000/1015 may be positioned such that they straddle the open furrow 980. FIG. 10A shows the furrow still open and FIG. 10B shows the operability of the closing wheels in closing the furrow 980. The seed 982 is positioned at the bottom of the furrow. However, even after the furrow 980 is closed, a seam 981 is still present. The seam 981 is formed by the walls of the furrow coming together during the closing process, but the soil is not necessarily interlaced between the walls. As such, a seam 981 remains. The seam 981 may be easily opened by excess water or dry conditions may allow a crack to form at the seam 981 that may damage the seed 982 planted at the base. It is this seam 981 that is beneficially treated by a press wheel 900 by helping to interlace soil across the seam by applying pressure.

In accordance with various embodiments, the press wheel 900 may be supported by an axle 965 that rotates about axis X. The axel 965 may rotate within hub 914. Hub 914 and the axle 965 may be supported by the trailing arm frame 1320. Alternatively, as discussed above, some other bracket may support hub 914 and/or the axle 965. Any known or developed bracket or support may position the press wheel 900 relative to one or more of the planter 900, the opening wheel 960, the closing wheels 1000/1015 to the trailing arm frame 1320 and/or the furrow 980.

Figures 13A, 13B, 13C, 13D, 13E, 13F:
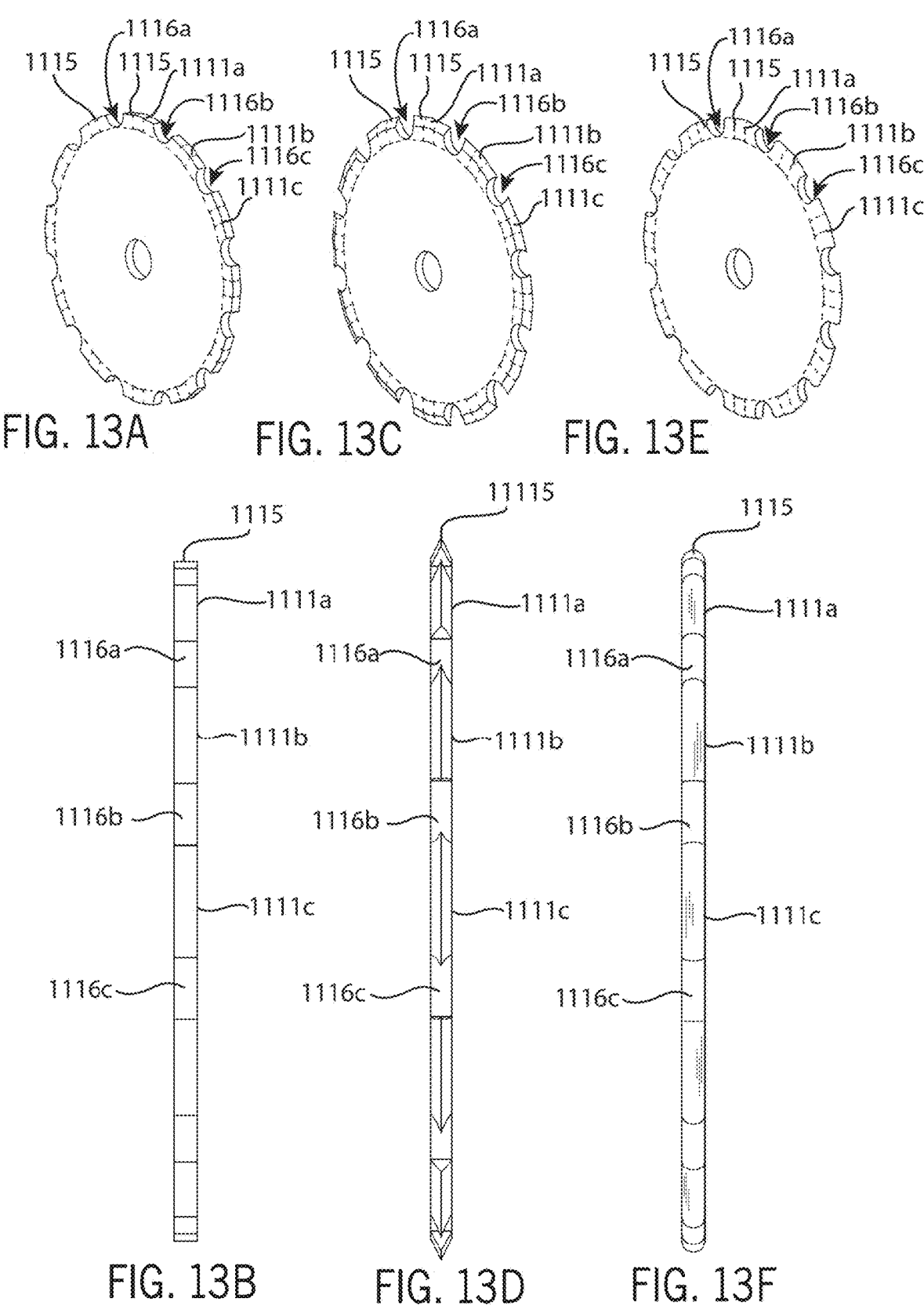

FIGS. 11A-11C illustrate various views of a press wheel 1100. The press wheel 1100 may be used with any of the furrow closing assemblies described herein, such as the furrow closing assemblies 500, 600, and 700, described above. As shown, the press wheel 1100 may rotate about axis X. The press wheel may have a hub 1114 and a rim 1110 formed around the axis X. The rim 1110 may extend generally radially from the hub 1114 which may rotate about axis X on an axle 1165. The rim 1110 may have side wall surfaces 1110a and opposite surface 1110 band a radial surface or edge 1115. The outer radial surface or edge 1115 may include any of a variety of profiles. FIGS. 13A-13F illustrate various embodiments of profiles for the radial surface or edge 1115 without the presence of tines extending therefrom. For example, the radial surface 1115 may be flat as illustrated in FIG. 13B. The radial surface 1115 may form a pointed edge as illustrated in FIG. 13D. The pointed edge may be sharp and knife like or it may merely taper to a round. The radial surface 1115 may form a rounded edge as illustrated in FIG. 13F. The various edge profiles may extend between a plurality of tread mounting features 1116. The tread mounting features 1116 may be apertures formed though the rim 1110 from a first surface 1110a to a second surface 1110b. The tread mounting features 1116 may be located wholly within the surface of the rim 1110 or they may pass though the rim and extend out and open the edge 1116 of the rim 1110. The tread mounting features 1116 may partition the radial edge of the rim 1115 into radial edge portions 1111. As shown, a plurality of tread mounting features 1116a, 1116b, and 1116c may form the adjacent radial edge portions 1111a, 1111b, and 1111c.

The rim 1110 may be formed from a portion of plate steel stamped into a circular plate. The side wall 1110a may include one or more apertures 1112 that extend through side wall 1110a. In embodiments having a plurality of apertures 1112, the space between the apertures 1112 may form spokes 1113. Each rim 1110 may have a plurality of spokes 1113. In one example, the rim 1110 may have three apertures and/or three spokes. The rim 1110 may have a center plane Y. The center plane Y may be defined as a plane perpendicular to the axis X. The center plane Y may generally bisecting the rim 1110. The center plane Y may define the center of the press wheel. While specific embodiments may be discussed herein, it may be noted that the rim 1110 may not be so limited but may be manufactured in accordance with any process to form any rim structure.

The rim 1110 may be a generally flat or planar-type structure, such as that shown in FIGS. 13A-13F. In other examples, the rim 110 may have a concave or bowl-type shape. For example, a face of the rim 1110 may be bowed or curved out from the axis of rotation X. It will be appreciated that the rim 1110, and press wheel 1100 more generally, may have substantially any size and shape, as may be appropriate for a given application. Further, the rim 1110 may include scallops, grooves, detents, and/or other features about an outer periphery or circumferential edge of the rim 1110. In the example of FIGS. 13A-13F, the tread mounting features 1116 are shown, as described above, which be configured to receive tines. In other examples, the tread mounting feature 1116 or other scallops may be larger or smaller than those in FIGS. 13A-13F and/or configured for a different function. For example, the rim 1110 may include scallops that are configured to engage soil during rotation of the press wheel 1100. Additionally or alternatively, the rim 1110 may include a first subset of scallops that are configured to receive tines, interposed with a second subset of scallops that are configured to engage soil during rotation. In other examples, other configurations of the rim 1100 are possible.

In accordance with various embodiments, the hub 1114 may be a central aperture 1119 in the rim 1110 allowing the rim 1110 rotate about an axle 1165. The internal aperture 1119 may extend axially through the press wheel 1100. In accordance with various embodiments, the hub 1114 may be operable to receive a bearing 1118 with the center of the bearing 1118 defining the aperture 1119 as shown in FIG. 11A. An aperture 1119 may pass axially through the bearing 1118. The hub 1114 may be defined by a cylindrical protrusion extending from the rim 1110. The cylindrical protrusion may be operable to provide additional support to the bearing 1118 and/or a shaft by providing greater width to the press wheel 1100 proximal to the interface between the press wheel 1100 and the axel shaft. The hub 1114 may be manufactured in accordance with any known process to form any known or developed structure of hub.

In accordance with various embodiments, the wheel 1100 may include a plurality of tread portions 1120. The tread portions 1120 may be formed on the radially exterior portion of the wheel 1100. The center plane Y may form a boundary from which the tread portions 1120 may extend in either direction. The tread portions 1120 may extend in only one direction from the center plane Y, or they may extend in both directions from the center plane Y. Adjacent tread portions 1120 on the same side of the center plane Y may have voids between each of the tread portions 1120. As used herein, the voids are a space sufficient to prevent the portion of the wheel 1100 between the adjacent tread portions from contacting the ground when in use. For example, the plurality of tread portions 1120 may have voids 1117 between adjacent tread portions on the same side of the rim such that in response to the wheel rotating and placing adjacent treads (e.g. treads 1120a and 1120b shown in FIG. 11A) proximal to the ground, the voids between the adjacent treads avoid allowing the wheel to contact the ground by components of the wheel other than the rim and/or the tread portions. In embodiment, wherein the tread portions are merely large treads extending from a tire with voids between the treads, the voids may also be sufficient to prevent the rim and any portion of the non-tread portion of the tire from contacting the ground. As indicated, the plurality of tines 1120 may be positioned on either one or both sides of the center plane Y. In accordance with various embodiments, the plurality of tines 1120 positioned on the same side of the rim 1110 may be structurally related to one another only by their attachment to the rim.

In accordance with various embodiments, the tread portions 120 may be defined as one or more tines extending out of the side wall of the rim and proximal to the radial surface of the rim. Each tine may have a plurality of connection ends (e.g. 1122a, 1122b, and 1122c) and a termination end (e.g. 1124a, 1124b, 1124c, 1126a, 1126b, 1126c). The connection end may extend through mounting feature 116 and fixed relative to the radial surface 1116 of the rim 1110. The tines 1120 may have a first portion 1123 extending out of a first side of the rim 1110a. The tines 1120 may have a portion 1125 extending out of the second side of the rim 1110b. In one embodiment the first portion 1123 and the second portion 1125 of the tines may be connected at the connection end 1122a. The one or more tines (e.g. 1123a, 1123b, 1123c, 1125a, 1125b, and 1125c) may extend perpendicular to the center plane Y. The one or more tines may extend radially but away from the center plane Y toward the axis X (i.e. a combination radial and axial components of direction). The one or more tines may extend in a direction that if viewed from the side such as shown in FIG. 11A, the one or more tines may appear to form a chord across the circle. For the one or more tines to form a chord (at least as viewed from the side as shown in FIG. 11A), the direction of the tine may be described as having both an axial component (i.e. along axis X), a radial component (i.e. directed toward axis X), and a tangential component (i.e. parallel with center plane Y). The axial component may be perpendicular to the rim or the center plane Y. A combination of these various components may direct the tines in a variety of different directions. In accordance with one embodiment, the tines may be directed at an angle such that they form a portion of a chord, a full chord, or more than a full chord across the rim when viewed from a side view.

The formation of this side-viewed chord may be accomplished by structuring the wheel such that a first connection end 1122a of a first tine 1120a is in axial alignment with the termination end 1126b and/or 1124b on an adjacent tine. Stated another way, a line/axis parallel with axis X that may pass through 1122a may also pass through 1126b and/or 1124b. In some embodiments, only one side of the wheel 1100 may be aligned (e.g. a 1122a and 1124b may be aligned but not 1122a and 1126b). In some embodiments, there may be no alignment.

In accordance with various embodiments, each of the tines 1120 may form a substantially planer structure. Meaning, the axis of 1122a to 1124a may be in the same plane as the axis of 1122a to 1126a. This planer structure may be formed, for example, by placing a simple bend in a length of steel rod. The steel rod may be welded to the rim 1110. Thus, each tine 1120 may occupy a planar structure. The tines and rim may be formed using any known process or material. For example, polymer tines may be attached to a polymer rim using adhesive. Alternatively or additionally, various materials may be cast, mold, machined, or formed by any other suitable process to form the rim and tines. The tines may be manufactured having the same diameter throughout. In some embodiments, the tines may not have a consistent diameter but may narrow to a point or have some other profile.

In accordance with various embodiments, the plurality of tines 1120 may include opposing tines 1123 and 1125. The tines 1123 and 1125 may be formed symmetrically on opposite sides of the center plane as shown in FIGS. 11A-11C. In various embodiments the tines 1123, 1125 may not be formed symmetrically on opposite sides of the center plane Y as shown in FIGS. 12A-12C. The tines may be positioned at different angles, lengths, or positions extending from the center plane Y. Even in embodiments wherein tines 1123 and 1125 are made from a single portion of steel rod, the rod may be attached to rim 1110 such that tines 1123 and 1125 are not symmetric. This may be accomplished by rotating the rod such that the angles of each of tines 1123 and 1125 on each side or the rim 1110 are different. Additionally or alternatively, tines 1123 may be longer than tines 1125. Tines 1125 may be longer than tines 1123. One side may be larger in diameter than the other. Lengths, diameters, and/or other characteristics may alternate between sides.

In accordance with various embodiments, the plane formed by the tines may be perpendicular to the center plane and/or the rim. The plane formed by the tines may also cut chords across the rim. Stated another way, the perpendicular distance from the axis X to the any point along the length of any of the tines 1120 may be equal to or less than the radial distance from the axis X to an exterior edge of the rim 1110.

FIGS. 12A-12C illustrate another embodiment of a press wheel 1400. The press wheel 1400 may include tread portions 1420 that are not symmetric. The press wheel 1400 may be used with any of the furrow closing assemblies described herein, such as the furrow closing assemblies 500, 600, and 700, described above. The tread portions 1420 may not even extend on each side of the rim 1410 from a common location. FIG. 12A is a perspective view of a press wheel in accordance with an embodiment of the present invention. As indicated above, the press wheel may rotate about axis X. The press wheel may have a hub 1414 and a rim 1410 formed around the axis X. The rim 1410 may extend generally radially from the hub 1414 which may rotate about axis X on an axle 1465. The rim 1410 may have side wall surfaces 1410*a* and a radial surface 1411. The rim 1410 may be formed from a portion of plate steel stamped into a circular plate. The side wall 1410*a* may include one or more apertures 1412 that extend through sidewall 1410*a*. In embodiments having a plurality of apertures 1412, the space between the apertures 1412 may form spokes 1412*a*. Each rim 1410 may have a plurality of spokes 1412*a*. In one example, the rim 1410 may have three apertures and/or three spokes. The rim 1410 may have a center plane Y. The center plane Y may be defined as a plane perpendicular to the axis X. The center plane Y may generally bisect the rim 1410. The center plane Y may define the center of the wheel. While specific embodiments may be discussed herein, it may be noted that the rim 1410 may not be so limited but may be manufactured in accordance with any process to form any rim structure.

In accordance with various embodiments, the hub 1414 may be a central aperture 1419 in the rim 1410 allowing the rim 1410 rotate about an axle 1465. The internal aperture 1419 may extend axially through the wheel 1400. In accordance with various embodiments, the hub 1414 may be operable to receive a bearing 1418 with the center of the bearing 1418 defining the aperture 1419. An aperture 1419 may pass axially through the bearing 1418. The hub 1414 may be defined by a cylindrical protrusion extending from the rim 1410. The cylindrical protrusion may be operable to provide additional support to the bearing 1418 and/or a shaft by providing greater width to the wheel 1400 proximal to the interface between the wheel 1400 and the axel shaft. The hub 1414 may be manufactured in accordance with any known process to form any known or developed structure of hub.

In accordance with various embodiments, the wheel 1400 may include a plurality of tread portions 1420. The tread portions 1420 may be formed on the radially exterior portion of the wheel 1400. The center plane Y may form a boundary from which the tread portions 1420 may extend in either direction. Adjacent tread portions 1420 on the same side of the center plane Y may have voids between each of the tread portions 1420. As used herein, the voids are a space sufficient to prevent the portion of the wheel 1400 between the adjacent tread portions from contacting the ground when in use. For example, the plurality of tread portions 1420 may have voids 1417 between adjacent tread portions on the same side of the rim such that in response to the press wheel rotating and placing adjacent treads (e.g. treads 1420*a* and 1420*c* shown in FIG. 12A) proximal to the ground. The presence of voids between the adjacent treads allow for condition of the ground by reducing the constant contact from the wheel but instead lighting turning the soil by allowing some soil to pass through the voids and only making contact with the rim and/or the tread portions. In embodiment, wherein the tread portions are merely large treads extending from a tire with voids between the treads, the voids may also be sufficient to prevent the rim and any portion of the non-tread portion of the tire from contacting the ground. As indicated, the plurality of tread portions 1420 may be positioned on either one or both sides of the center plane Y. In accordance with various embodiments, the plurality of tread portions 1420 positioned on the same side of the rim 1410 may be structurally related to one another only by their attachment to the rim.

In accordance with various embodiments, the tread portions 1420 may be defined as one or more tines extending out of the side wall of the rim and proximal to the radial surface of the rim. Each tine may have a connection end (e.g. 1422*a*, 1422*b*, and 1422*c*) and a termination end (e.g. 1424*b*,

1426*a*, 1426*c*). The connection end may be fixed to the radial surface 1411 of the rim 1410. The one or more tines (e.g. 1423*a*, 1423*b*, 1423*c*) may extend perpendicular to the center plane Y. The one or more tines may extend radially but away from the center plane Y toward the axis X (i.e. a combination radial and axial components of direction). The one or more tines may extend in a direction that if viewed from the side such as shown in FIG. 12A, the one or more tines may appear to form a chord across the circle. For the one or more tines to form a chord (at least as viewed from the side as shown in FIG. 12A), the direction of the tine may be described as having both an axial component (i.e. along axis X), a radial component (i.e. directed toward axis X), and a tangential component (i.e. parallel with center plane Y). The axial component may be perpendicular to the rim or the center plane Y. A combination of these various components may direct the tines in a variety of different directions. In accordance with one embodiment, the tines may be directed at an angle such that they form a portion of a chord, a full chord, or more than a full chord across the rim when viewed from a side view.

The formation of this side-viewed chord may be accomplished by structuring the wheel such that a first connection end 1422*b* of a tine 1420*b* is in axial alignment with the termination end 1426*c* on an adjacent tine 1420*c*. Stated another way, a line/axis parallel with axis X that may pass through 1422*b* may also pass through 1426*c*. In accordance with various embodiments, tines 1420 may extend from only one side of the wheel 1400 at a time. As such the connection end 1422 may only align with one end of a tine. In some embodiments, there may be no alignment.

In accordance with various embodiments, each of the tines 1420 may form a substantially planer structure. Meaning, the axis or center line of the tine extending from 1422*a* to 1426*a* may be in a single plane. This planer structure may be formed, for example, by placing a simple bend in a length of steel rod or merely extending a straight rod from the surface of the rim 1420 outwardly at an angle. The tines and rim may be formed using any known process or material such as those already discussed herein. The tines 1420 may be manufactured having the same diameter throughout. In some embodiments, the tines 1420 may not have a consistent diameter but may narrow to a point or have some other profile.

Unlike traditional press wheels, in accordance with various embodiments, the press wheels discussed herein may not smear the soil over the furrow. Instead, the press wheel may engage and press the soil into the voids between the tread portions thus preventing or limiting the press wheel from forcing and/or smearing the soil to the sides of the press wheel. By not forcing soil out from under the press wheel but instead merely moving soil into the voids between the tread portions and over the closed furrow seam, it leaves a mellow treated soil that minimizes the soil from crusting over the seeded furrow. A hot, windy day won't affect or make the soil hard or bake and crust as it does with traditional tire pressing wheels that do not have sufficient voids between contact patches of the press wheel. Other wheels, pull soil in from each side of the seed trench with significant velocity causing rooster tail during planting. This design works the sides of the closed furrow seam and does not contact the closed furrow seam directly over top, whereas the press wheel as discussed herein may be operable to work directly over top of the closed furrow seam. The first contact point is in the center and the tines located to the side slowly engage the soil moving outwardly from the closed furrow seam. As such, work is performed from the center out relative to the closed furrow seam.

In accordance with various embodiments, a method may be utilized whereby soil is conditioned over top of a closed furrow by applying a press wheel to the proximity of the furrow seam. The press wheel may be configured such that a pattern resembling a chicken track is laid over top or in the proximity of the furrow seam. The soil may be conditioned by the press wheel by contacting the soil above or proximate to the closed furrow seam 1281 and then working the soil outwardly as the press wheel continues to roll. The contact may be made by one or both of the rim 1110 and the attachment portion 1122 of the tines 1120. As the press wheel 1100 rolls, portions of the tread portions 1120 progressively distal to the center plane contact the ground, thereby working the soil outwardly. The soil is pressed in the voids between the tread portions 1120 and avoids any contact with webbing or material that extends between the tread portions except in some embodiments at the center plane. In embodiments utilizing tines for tread portions 1120 there is no material on the wheel between tines that extend away from the rim 1110. Therefore, there is nothing to contact the ground between the portions of tines that extend from the rim. As the press wheel 1100 continues to roll the tines lift from the ground, again moving inside out. In various embodiments, as soon as the distal portion of one tread portion 1120 is lifting from the ground, the attachment portion 1122 of another tread portion 1120 begins engaging the ground. However, in other embodiments the tines may have closing or further spacing from one another. The spacing may be a function of the seed location such that tines engage the soil once, twice, three times, and/or more contacts between seed locations.

Although various representative embodiments of agricultural planters have been described herein with a certain degree of particularity, those skilled in the art could make numerous alterations to the disclosed embodiments without departing from the scope of the inventive subject matter set forth in the specification and claims. The various embodiments discussed herein are not exclusive to their own individual disclosures. Each of the various embodiments may be combined with or excluded from other embodiments. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the example embodiments described herein, and are not limiting, particularly as to the position, orientation, or use of the inventive concepts unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other unless specifically stated.

In some instances, components are described with reference to "ends" having a particular characteristic and/or being connected with another part. However, those skilled in the art will recognize that the components described are not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A trailing assembly for an agricultural planter comprising a mounting bracket configured for attachment to a frame element of the agricultural planter;

a walking beam defining a hub at an intermediate position along a length of the walking beam, wherein the hub is pivotably attached to the mounting bracket and wherein the walking beam further comprises:

a first arm and a second arm fixed to the hub adjacent to each other at first attachment ends and extending away from the hub in a first direction to second attachment ends;

a first shaft positioned proximal to the second attachment end of the first arm and rotatably and selectively coupled to a first closing wheel;

a second shaft positioned proximal to the second attachment end of the second arm and to rotatably and selectively coupled to a second closing wheel; and a third arm and a fourth arm fixed to the hub adjacent to each other at first connection ends and extending away from the hub in a second direction to second stay ends, the second stay end of the third arm defines a first aperture and the second stay end of the fourth arm defines a second aperture coaxial with the first aperture;

wherein the third arm and the fourth arm are fixed to a different side of the hub from the first arm and the second arm;

the second stay ends are parallel to each other and define a space between each other; and the first aperture and the second aperture are rotatably and selectively coupled to opposing ends of an axle of a press wheel positioned between the third arm and the fourth arm, the press wheel configured to compress soil of a seed furrow closed by the first closing wheel and the second closing wheel.

2. The trailing assembly of claim 1 further comprising a parallel linkage pivotably connecting the mounting bracket to the frame element.

3. The trailing assembly of claim 1, wherein the press wheel comprises a hub which rotates about an axis of the axle, a rim extending generally radially from the axis and defining a circumferential portion, and a plurality of tread portions connected to the rim along the circumferential portion and defining voids between adjacent tread portions.

4. The trailing assembly of claim 3, wherein each of tread portions comprises a tine having a first tine portion extending from a first side of the rim and a second tine portion extending from a second side of the rim.

5. The trailing assembly of claim 4, wherein the first tine and the second tine portions form a V-shaped pattern.

6. The trailing assembly of claim 1, wherein the walking beam is pivotably coupled to the mounting bracket such that a pivoted displacement of the first closing wheel or the second closing wheel causes a pivoted displacement of the press wheel.

7. The trailing assembly of claim 6, wherein the pivoted displacement of the first closing wheel or the second closing wheel is in a first direction, and the walking beam is configured so that when the hub is joined to the mounting bracket, the pivoted displacement of the first closing wheel or the second closing wheel in the first direction causes a pivoted displacement of the press wheel in a second direction opposite the first direction.

8. A trailing assembly for an agricultural planter comprising a mounting bracket configured for attachment to a frame element of a trailing arm assembly;

a walking beam defining a hub at an intermediate position along a length of the walking beam, wherein the hub is pivotably coupled to the mounting bracket and wherein the walking beam further comprises a first arm and a second arm each extending from a first portion of the hub, and a third arm and a fourth arm each extending from a second portion of the hub and generally away from the first arm and the second arm;

a first closing wheel rotatably coupled with the first arm;

a second closing wheel rotatably coupled with the second arm; and a press wheel rotatably coupled between the third arm and the fourth arm via an axle supported by a first aperture defined by the third arm and a second aperture defined by the fourth arm and coaxial with the first aperture and configured to compress soil of a seed furrow closed by the first closing wheel and the second closing wheel.

9. The trailing assembly of claim 8, further comprising a parallel linkage pivotably connecting the mounting bracket to the frame element.

10. The trailing assembly of claim 8, further comprising a closing system pivotally connecting the walking beam and the mounting bracket at a single pivot.

11. The trailing assembly of claim 8, wherein the press wheel is selectively coupled to the third arm and the fourth arm using the first and second apertures to define a height of the press wheel in the assembly.

12. The trailing assembly of claim 8, wherein the walking beam is pivotally coupled to the mounting bracket such that a displacement of the first closing wheel or the second closing wheel causes a pivoted displacement of the press wheel.

13. The trailing assembly of claim 8, wherein the first closing wheel and the second closing wheel are arranged relative to one another to define a V-shape relative to a vertical axis of the trailing assembly.

14. The trailing assembly of claim 8, wherein one or both of the first closing wheel and the second closing wheel comprises a plurality of tread portions extending away from a circumferential portion of the respective one of the first closing wheel or the second closing wheel.

15. The trailing assembly of claim 14, wherein the plurality of tread portions extend angularly away from a center plane of the respective one of the first closing wheel or the second closing wheel.

16. The trailing assembly of claim 8, wherein the press wheel comprises a plurality of tines extending away from a center plane of the press wheel, wherein the plurality of tines have voids between adjacent tines, which in response to the press wheel rotating operably places consecutive adjacent tines proximal to a ground surface.

17. An agricultural planter comprising a walking beam comprising a first arm, a second arm, and a press wheel arm section, wherein each of the first arm, the second arm and the press wheel arm section extend away from a pivotal coupling of the walking beam to a mount of the agricultural planter, the press wheel arm section defining a third arm defining a first aperture and a fourth arm defining a second aperture coaxial with the first aperture;

a first closing wheel rotatably coupled to the first arm;

a second closing wheel implement rotatably coupled to the second arm; and a press wheel rotatably coupled with the press wheel section via an axle supported at and positioned between the first aperture and the second aperture to compress soil of a seed furrow closed by the first closing wheel and the second closing wheel.

18. The agricultural planter of claim 17, wherein one or both of the first closing wheel and the second closing wheel comprise closing discs.

* * * * *